United States Patent [19]
Davis et al.

[11] Patent Number: 5,617,777
[45] Date of Patent: Apr. 8, 1997

[54] DEEP FAT FRYING APPARATUS WITH AUTOMATED OIL MANAGEMENT

[75] Inventors: John R. Davis; Ralph L. Macy, Jr., both of Shreveport; John M. Kinch, Bossier City, all of La.; Lynn L. Stark, Tyler, Tex.

[73] Assignee: The Frymaster Corporation, Shreveport, La.

[21] Appl. No.: 457,862

[22] Filed: Jun. 1, 1995

[51] Int. Cl.⁶ .................................................. A47J 37/12
[52] U.S. Cl. ................................ 99/408; 99/330; 99/403; 210/167; 210/DIG. 8
[58] Field of Search ............................. 99/330–332, 336, 99/403–418; 126/374, 383, 391; 210/167, DIG. 8; 219/494, 497, 437, 501; 426/233, 438

[56] References Cited

U.S. PATENT DOCUMENTS

| | | | |
|---|---|---|---|
| 2,840,436 | 6/1958 | Mason | 312/284 |
| 3,707,907 | 1/1973 | Wilson et al. | 99/408 |
| 3,716,140 | 2/1973 | Keating | 210/167 |
| 3,735,693 | 5/1973 | Pelster et al. | 99/408 |
| 4,324,173 | 4/1982 | Moore et al. | 99/330 |
| 4,444,095 | 4/1984 | Anetsberger et al. | 99/408 |
| 4,502,373 | 3/1985 | Keating | 99/337 |
| 4,890,548 | 1/1990 | Grob et al. | 37/12 |
| 4,899,649 | 2/1990 | Grob et al. | 27/12 |
| 4,974,501 | 12/1990 | Grob et al. | 99/408 |
| 5,038,676 | 8/1991 | Davis et al. | 99/330 |
| 5,141,760 | 8/1992 | Davis et al. | 426/233 |
| 5,490,449 | 2/1996 | Meister et al. | 99/403 X |

*Primary Examiner*—Timothy F. Simone
*Attorney, Agent, or Firm*—Harris, Tucker & Hardin, P.C.

[57] ABSTRACT

An automated deep fat frying apparatus comprises a plurality of cooking vats in a housing having a filter pan pump assembly. The apparatus has an oil distribution system and a control system having a computer programmed to operate and control oil transfer functions. Motor operated drain and return valves with position sensors are installed on each vat in the oil distribution system and operated by the control system to provide an automatic filter function and an oil transfer function whereby oil is drained from a first vat and transferred to a second vat according to selection inputs from the operator. The system includes operator selectable automated fill and dispose functions. In addition to valve position sensors, the system includes oil level sensors in the vats and filter pan, a pan position sensor and may include level sensors in a supply or dispose tank tied in to the control system which prevent mishaps during oil transfer operations. An error routine signals the operator and aborts the process if a malfunction is detected that might result in danger resulting from hot oil transfer.

23 Claims, 12 Drawing Sheets

5,617,777

DEEP FAT FRYING APPARATUS WITH AUTOMATED OIL MANAGEMENT

BACKGROUND OF THE INVENTION

1. Field of the Invention

The present invention relates generally to commercial cooking equipment and more particularly to immersion fryers having automated oil management functions.

2. Background of the Prior Art

Conventional deep frying apparatus is commonly used in fast food restaurants for immersion frying of foods such as french fries, breaded chicken and fish. Single or plural deep flying vats are supported in a housing containing gas or electric heating systems which are usually individualized to a particular vat. Current technology includes a cooking computer built into the housing which usually controls the temperature of the cooking fluid and can adjust the time of cooking to take temperature variations into account for the sake of cooking consistency. Available selections enable an operator to select cooking cycles specific to particular products.

Such commercial units are known to include filter pans which roll into the housing and releasably connect to the drain outlet of a manifold which can collect oil from individual vats through manually openable and closeable valves in drain lines of the vats. A filter pump has an inlet connected to the filter pan to pump oil to a selected vat through a return line with branches leading to each vat through a manually operated return valve. In this way, life of the oil in a particular vat can be extended and undesirable burned food particles removed by recirculating oil through a filter in the filter pan and returning it to the vat from which it came or to another vat. Such a system is disclosed in U.S. Pat. No. 4,890,548 incorporated herein by reference.

Eventually the used oil must be discarded because of deterioration or other factors which create undesirable flavors in the cooked food. This is accomplished by opening the manual drain valve to drain the oil to the filter pan and then rolling the filter pan containing the hot oil out of the housing across the floor of the work area to a disposal container or sump. In many cases the filter pan may have to be lifted with gloves and physically dumped into a disposal container. Alternately, a pump can be put in the filter pan and connected to a dispose container or line leading to a container, all of which creates safety hazards for the employees.

Since the filter pan always has at least one drain line or supply line connected to it at the housing, residual oil runs from the disconnected line onto the floor, generating a sanitation and slipping hazard. Attempts to use easily made separable connections to such lines when the filter pan is rolled into the housing, have not solved the retained oil drippage problem and create additional problems in that the "O"-rings get cut or damaged, creating another source of leakage.

Filling or refilling of vats is accomplished manually by dumping the contents of 35 pound oil containers or blocks of meltable shortening into the individual vats. Often this is done while adjacent vats have oil heated to high temperatures. One can easily imagine the safety hazards associated with this operation where the operator must stand close to heated vats while lifting and dumping the oil on a potential slippery floor. The fill operation and the dispose operation both require considerable operator dexterity and time consuming attention which adds to the burden of a job which usually has low skilled employees and high turnover and requires constant training.

It is accordingly an object of the present invention to solve these and other problems, increase efficiency and safety of operation, simplify operator functions, reduce the time required for oil transfer operations, incorporate safety devices which prevent mistakes in oil transfer operations, and automate the oil transfer functions including the fill and dispose functions.

SUMMARY OF THE INVENTION

In carrying out the principles of the present invention, in accordance with a preferred embodiment thereof, a deep fat frying apparatus and method of operation is provided in which oil management functions comprising the transfer of oil, oil filtration, and the fill and dispose functions are automated by means of a control system which has electric motor operated valves to control the flow of oil. The motor operated valves are preferably position indicating valves in which position indicating sensors are tied into a control system to enable the control system to determine the operating position of any valve before or after operating commands are given to the valve motors.

The invention is applicable to automate the oil transfer functions of a deep fat frying apparatus having a housing, a plurality of vats, a heating system employing electric or gas heaters for heating oil in the vats and a conventional cooking control which controls the heating system and cooking cycles, an oil filter pan assembly having a filter pan which contains a filter, a filter pump connected to the filter pan, a transfer line connected to the outlet of the filter pump, the transfer line leading to an inlet manifold having return lines to each vat, and drain lines from each vat connected to a drain manifold having an outlet for draining cooking oil into the filter pan in place under the cooking vats in the housing. Motor operated valves are provided for the drain and return line of each vat so that the oil transfer to or from each vat can be controlled individually. The motor operated valves have an open and a closed position and a position indicating sensor preferably in the form of a switch which opens or closes a circuit to indicate whether the valve is in the closed position which is normally the position of most concern. If a motor operated valve is closed, oil cannot be transferred even if a pump is operated. When a motorized valve reaches the desired open or closed position, the control system sends a signal to the motor operator of the valve causing it to stop with the valve in the desired open or closed position.

The frying apparatus is provided with a control system having circuits electrically connected to each of the motor operated valves and pumps, comprising a programmed oil management computer having an interface with operator selectable oil transfer functions effective for operating the motor operated valves and filter pump or supply pump in sequence to accomplish a selected oil transfer function.

The normal oil transfer functions include a filter function and a transfer function. In the filter function, oil is drained from a selected vat through a filter into the filter pan, recirculated by the filter pump through the return line, motor operated return valve and return line of the selected vat for a time sufficient to "polish" the oil by removing particulate matter. The oil transfer function involves draining oil into the filter pan from a first vat followed by pumping the drained oil from the filter pan through the transfer line, motor operated return valve and return line of a different empty second vat. This is often done to transfer used oil to a different vat into which less sensitive products are to be cooked.

Before an oil transfer function is attempted, the control system establishes an initial closed position of said motor operated valves in reliance on the position indicating sensors, the closed position of the valves being the safe status quo condition of the apparatus. If the motor operated valves are not in the closed position when an oil transfer function is selected, the control system enters an error routine wherein a warning to the operator is flashed on a display and the system returns to an idle status.

In response to selection of the filter function and a selected vat, and assuming that the initial closed position of the valves is found, the control system sends a control signal to effect opening of the motorized valve on the drain and return lines of the selected vat, preferably tests the position of said valves, operates the filter pump to recirculate oil between the filter pan and the selected vat for a time period, sends control signals to effect closing of the drain valve of the selected vat, operates the filter pump for a time sufficient to return the oil, shuts off the filter pump and sends control signals to effect closing of the return valve of the selected vat.

Upon selection of an oil transfer function at the interface and the selection of a first vat with old oil and an empty second vat, the step of opening and closing at least one motor operated valve and operating the filter pump comprises sending control signals to open the drain valve on the first vat and open the return valve on the second vat, operating the filter pump for a time period sufficient to transfer the old oil between the filter pan and the second vat and returning to the initial condition in a sequence that involves sending control signals to close the motor operated return valve on the first vat, shut off the filter pump and close the motor operated return valve on the second vat to complete the oil transfer function.

The apparatus preferably includes automation of the dispose function by means of the filter pump. The apparatus is provided with a dispose line fluidly connected to the return line and another motor operated valve comprising a dispose valve in the dispose line leading to a container for used oil which is preferably outside the work area. A dispose function is provided on the interface of the control system. When a dispose function is selected, the control system sends control signals to open the drain valve on a selected vat, open the dispose valve and operate the filter pump for a time sufficient to pump the contents of the filter pan which had been drained from the selected vat, through the dispose line for disposal. In similar manner, to complete the dispose function, the control system sends signals to close the drain valve on the selected vat, shut off the filter pump and close the motor operated dispose valve. Thus all motor operated valves are returned to the initial condition and the filter pump is shut off when the dispose oil transfer function is complete. The dispose line leads to a disposal container for used oil which is external to the housing.

The apparatus further preferably includes an automated fill function which is added to the interface to supply new oil to a selected vat. There is provided a new oil supply tank or drum, a supply pump connected to the oil supply and wired into the control system, and a supply line on the pressure side of the supply pump leading to the inlet manifold. Upon selection of the fill function and a selected vat, the control system sends a signal to open the return line on the selected vat by operating the motor operated return valve and operating the supply pump for a time sufficient to provide the desired amount of oil in the selected vat.

The invention preferably includes the provision of an oil level sensor on each of the vats, the oil level sensors being electrically connected in a circuit to the control system and responsive to the presence of a substantial quantity of oil in a vat by altering the electrical circuit. The oil level sensors are particularly effective for use during the fill cycle and the transfer oil function, the oil management computer being programmed to test said circuits before opening the electrically operated return valve on a selected vat in response to an operator's selected oil transfer function which requires the transfer of oil to the selected vat, the control system entering an error routine if the oil level sensor in the selected vat indicates that said substantial quantity of oil is already present, to prevent overfilling said vat with oil.

The apparatus further preferably includes a filter pan position switch connected to a circuit of said control system, an electrical change in the circuit between the pan position switch and the control system being indicative of the oil filter pan assembly being present in the housing to receive drained oil, the oil management computer being programmed to test the circuit for the pan position switch before opening the selected drain valve, displaying a message to the operator, and entering an error routine if the pan is not present, so that hot oil will not be drained on the floor.

The apparatus preferably further contains an oil level sensor in the oil filter pan, having a switch responsive to a full oil filter pan condition, the switch being connected in a circuit to the control system wherein the oil management computer is programmed to test the circuit of the oil level sensor to determine whether or not the oil filter pan is full before opening a selected drain valve, displaying a message to the operator and entering an error routine if the oil filter pan is already full, to prevent overflowing hot oil on the floor.

In another aspect of the invention, the oil management computer is programmed to set a time on a valve timer before opening any of said motor operated valves, decrementing the time while testing the position of the valves by means of the position indicating switch on the valves, and entering an error routine if said valves are not in the desired position when the time has expired.

In another aspect of the apparatus, what amounts to a flow sensor is installed on the output side of the filter pump comprising a pressure switch operatively connected to the control system which is used to control the operation of the filter pump in response to a signal from said pressure switch indicative of a drop in pressure resulting from the presence of air when the filter pan becomes empty. This signal can be used in lieu of using a time interval to determine when the pump can be shut off. The system can further include conventional oil level sensors, such as a float and switch combination wired to the control system to allow it to monitor the filled or untilled condition of the supply or dispose tanks.

DETAILED DESCRIPTION OF THE PREFERRED EMBODIMENT

Figure 1:
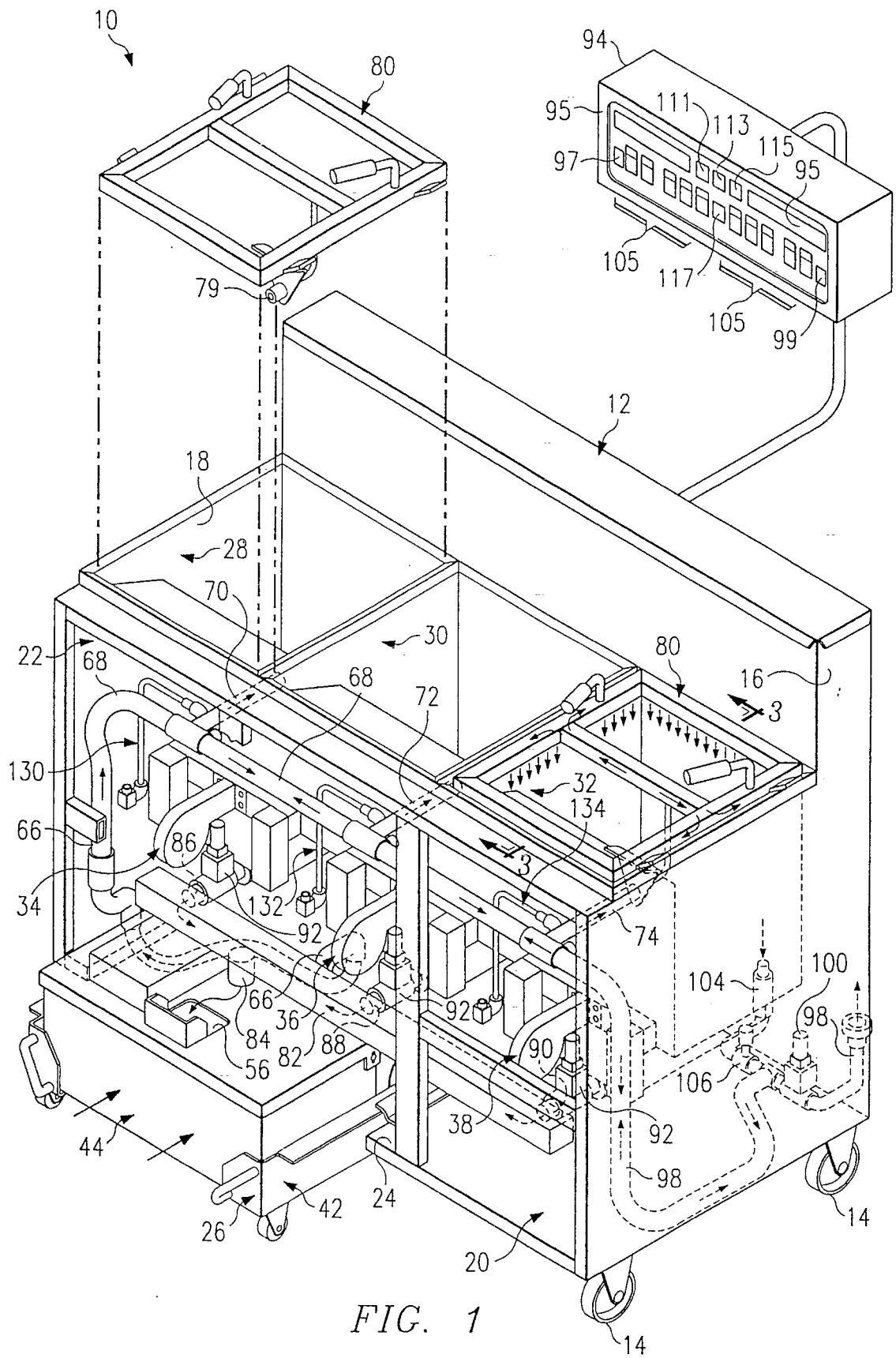
FIG. 1 is a perspective view of the fryer assembly showing the housing with three adjacent vats, the oil filter pan assembly partly pulled out from the housing, and the interface for the control system, with the front panel and cooking computer portions removed for clarity.

As illustrated in FIG. 1, the preferred embodiment of the invention is a deep fat frying apparatus referred to generally by the referenced numeral 10. Frying apparatus 10 includes a housing 12 supportable on the floor by means of wheels 14. Housing 12 has a pair of opposite side walls 16, 18, a front wall which has been removed in FIG. 1, an open lower end, a lower internal portion 20, an upper internal portion 22 positioned directly above lower internal portion 20 and an access opening 24 through said front wall into the lower internal portion 20 for receiving oil filter pan assembly 26. A plurality of fry pots or vats 28, 30 and 32 are mounted in closely adjacent side-by-side relationship within upper internal portion 22 of housing 12. Each of the frying vats has an upper cooking portion with a narrow well portion depending therefrom, best seen in schematic FIG. 5.

Housing 12 contains a heating system comprising individual gas or electric heaters 34, 36 and 38 which are illustrated as gas burners in FIG. 1. Heaters 34, 36 and 38 are conventional heaters which are operated and controlled by a conventional cooking computer for each frying vat. The conventional cooking computers referred to may be like those found in U.S. Pat. Nos. 4,437,159, 4,858,119 or 4,672,540, the disclosures of which are hereby incorporated by reference. The conventional cooking computers, individual to each fry pot, have been removed along with the front panel for clarity. They control the oil temperature and adjust the cooking time for different products. It will be understood throughout that the term oil or cooking oil refers to any liquid cooking medium, including melted shortening or even water for cooling vat systems for pasta, for example.

Figure 2:
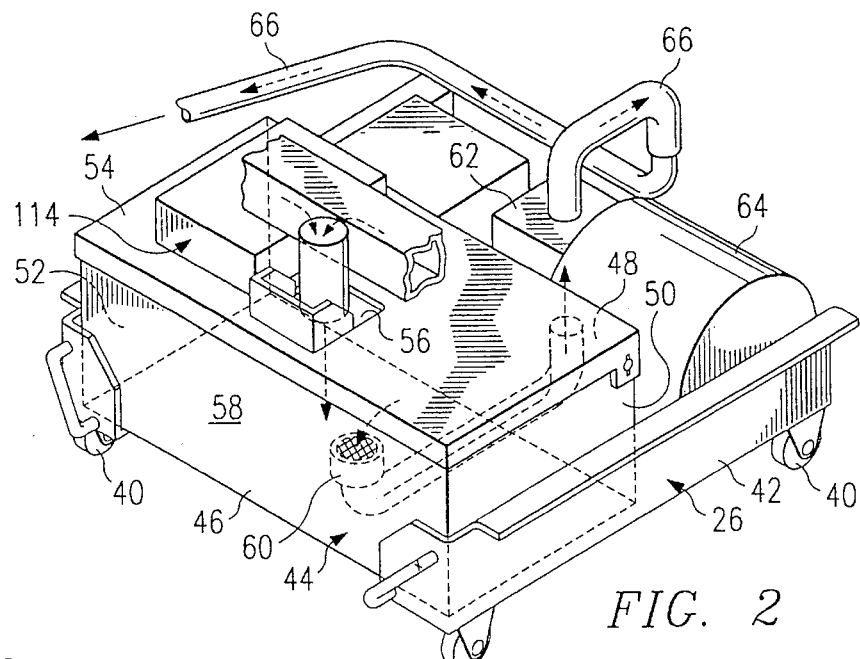
FIG. 2 is a right front perspective view of the oil filter pan assembly comprising the oil filter pan, drive motor and filter pump and a portion of the transfer line.

By reference to FIG. 2, oil filter pan assembly 26 preferably has wheel supports 40 supporting a carriage 42. Carriage 42 supports a filter pan 44 having front wall 46, rear wall 48, side walls 50, 52 and an openable lid 54 having an inlet opening 56. Bottom wall 58 has a depending drainage sump 60 leading to the inlet of a filter pump 62 driven by electric motor 64. The filter pump and drive motor are carried by carriage 42 along with filter pan 44. The walls of the filter pan form a reservoir sized to receive and hold the entire cooking fluid content of a frying vat and has a cooking fluid filter element (not shown) operatively arranged to filter cooking fluid passing between inlet 56 and drain sump 60. Filter pump 62 has its inlet communicating with the interior of drainage sump 60 through a pipe and has an outlet connected to transfer line 66 operable to convey oil under pressure through the transfer line to an oil distribution system. When the pump is on, oil flows in the direction of the arrows as shown in FIG. 2 and the left to right arrows in FIG. 1.

Figure 3:
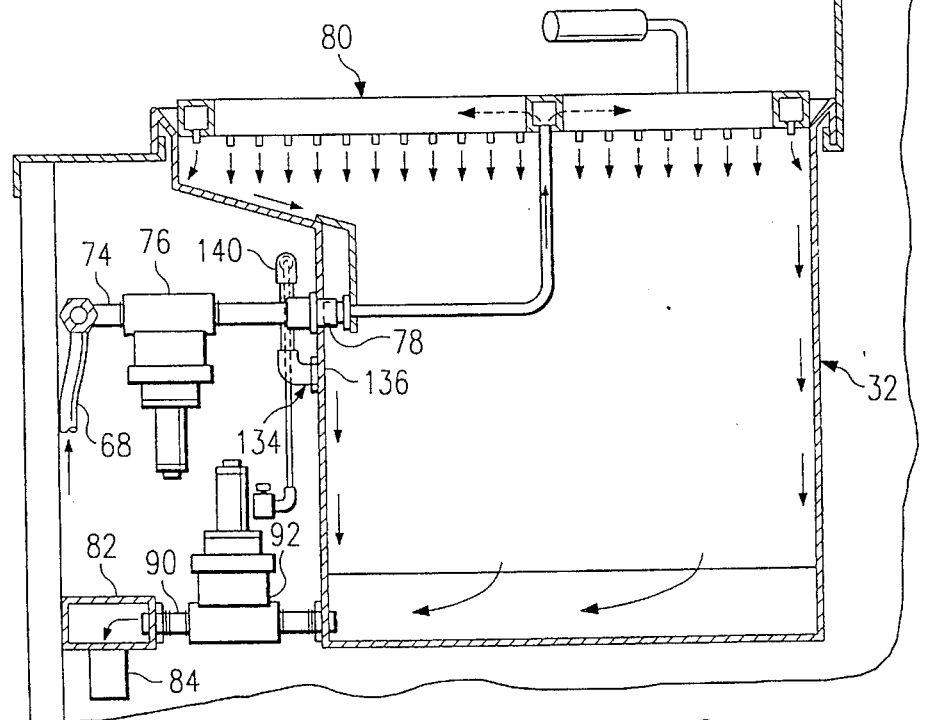
FIG. 3 is a cut-away elevation of an individual vat on the line of 3—3 of FIG. 1 showing the drain and return lines entering the vat through the electrically operated valves.

Referring now to FIGS. 1 and 3, the oil distribution system comprises transfer line 66 leading in fluid communication to inlet manifold 68 having return lines leading to each vat through an electrically operated return valve. Return line 70 is in fluid communication with vat 28, return line 72 is in fluid communication with vat 30 and return line 74 is in fluid communication with vat 32. Each of return lines 70, 72 and 74 have a return valve 76 as illustrated in FIG. 3. Oil passes in the direction of the arrow in FIG. 3 through manifold 68, return line 74, through electrically operated valve 76 to enter the front of vat 32 at a connection 78. Connection 78 is adapted to receive the inlet 79 of a removable shower unit 80 which wraps around the upper perimeter of each frying vat to aid in the removal of debris during a filtering or cleaning operation. Filtered oil flows in the direction of the arrows down the sides of a vat. Shower unit 80 is removed and set aside during normal operation of frying apparatus 10.

The oil distribution system in FIGS. 1 and 3 further includes drain manifold 82 having a drain 84 leading to inlet 56 of oil filter pan 44 when the filter pan assembly is received in the housing in proper position through access opening 24. Each vat has a drain line located at the lowest point of its bottom, fluidly coupled to the drain manifold through an electrically operated drain valve 92. Vat 28 has a drain line 86, vat 30 has a drain line 88, and vat 32 has a drain line 90. When a drain valve is open, oil flows from the drain line in the direction of the arrows in FIGS. 1 and 3.

Figure 5:
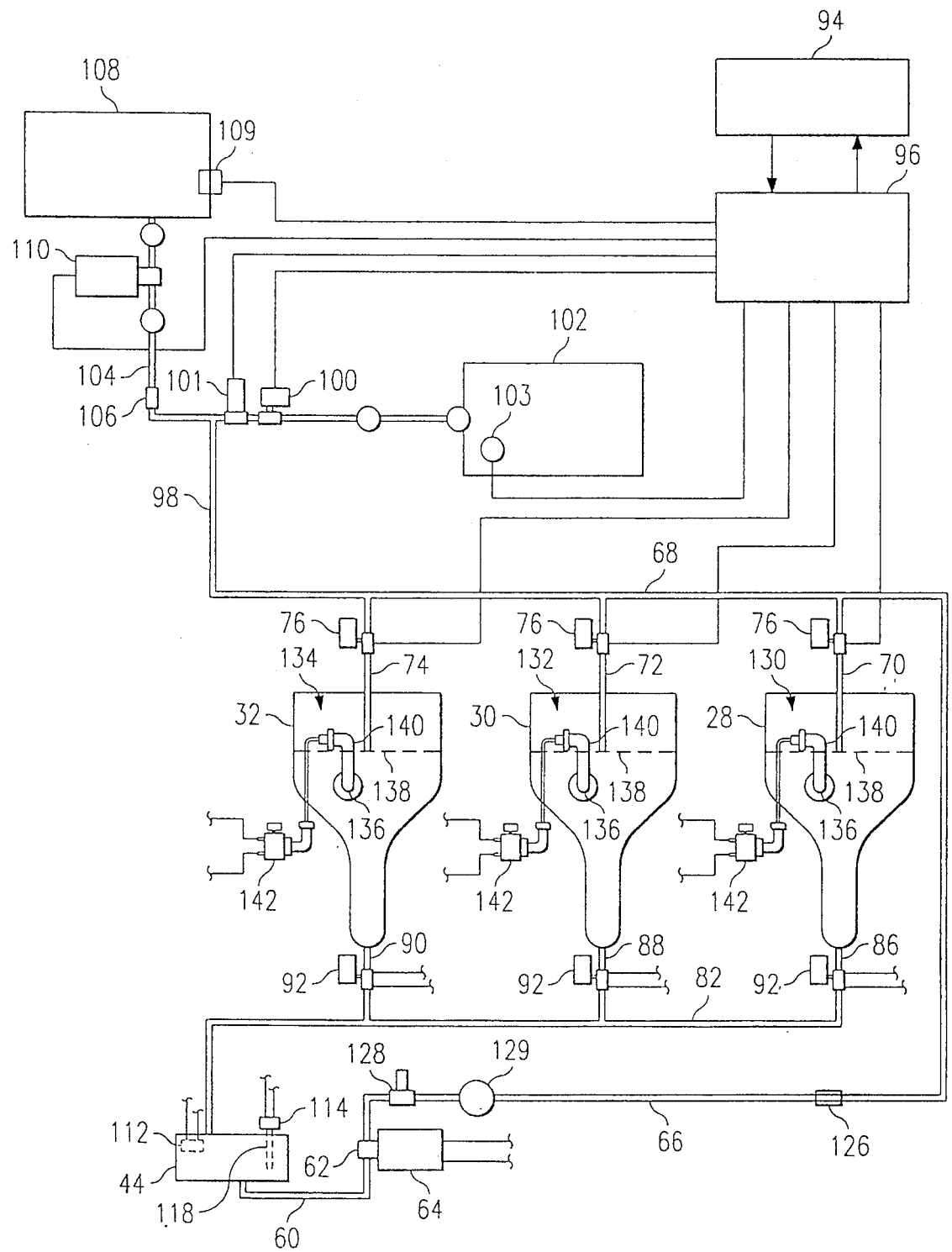
FIG. 5 is schematic showing the oil distribution system and control system with electrically operated valves.

Referring now to FIGS. 1 and 5, frying apparatus 10 has a control system having circuits interconnecting the electrically operated valves and filter pump, comprising a programmed oil management computer 96 having an interface 94 for selecting oil transfer functions, displaying messages, receiving operator selections and converting operator inputs into signals effective for operating all of the electrically operated valves and filter pump in sequence in order to transfer oil to or from a selected vat 28, 30, 32 and filter pan assembly 26, to dispose of oil or to fill a vat from a supply tank. It will be seen that in FIG. 5, some of the sensors, motors and motor operated valves have lines schematically connecting them to oil management computer 96 while other of the sensors, motors or motor operated valves have two schematic wires attached to them which in fact are also connected to computer 96 but not so indicated in FIG. 5 for the sake of clarity. All of them are connected to oil management computer 96 through latches and devices described later in the discussion of the flow charts.

In FIG. 1, interface 94 has displays 95 for displaying messages to the operator, off-on button 97, an enter button 99, and a series of number buttons 105 comprising numbers 1 through 9 and zero for numerical input. Interface 94 has operator selectable oil transfer functions comprising buttons 111 for fill, 113 for filter, 115 for dispose and 117 for the transfer function which will be described later. Additional function buttons or displays including audible alarms associated with displays and status lights as indicated in FIG. 1 above the number buttons, can be used to alert or inform the operator.

Figure 3A:
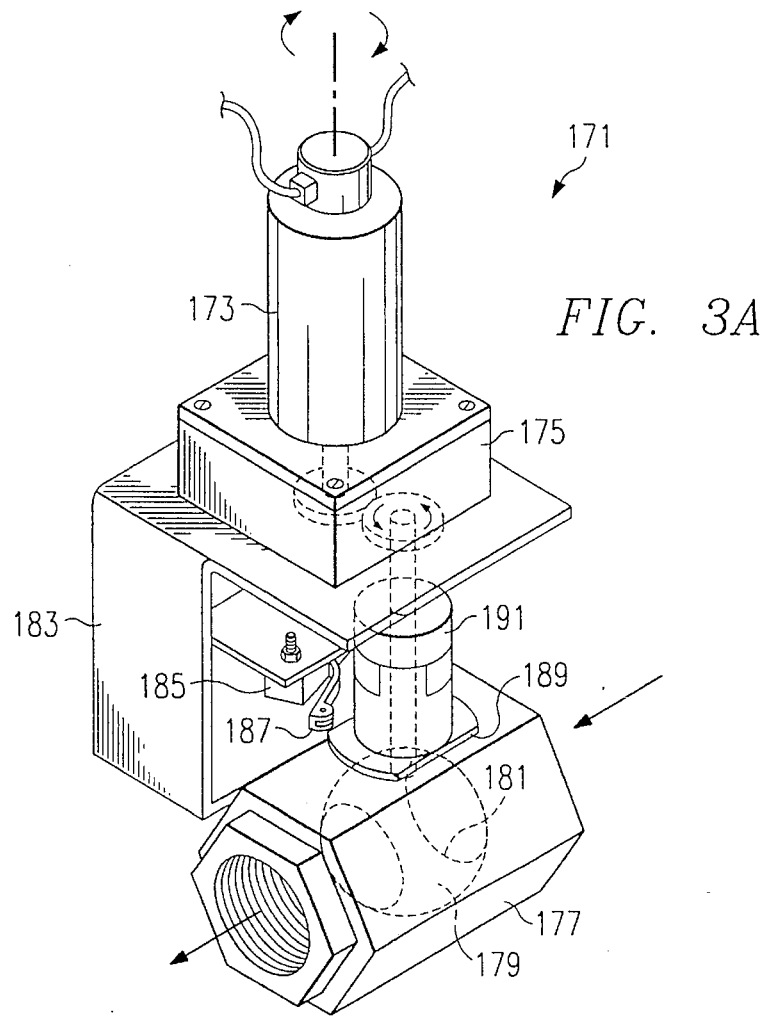
FIG. 3A is a schematic perspective view of one of the motor operated valves.

Before proceeding, a schematic representation of the electrically driven motor operated valves, 76, 92 and 100 will be discussed with reference to FIG. 3A. The motor operated valve assembly is referred to generally by the reference numeral 171. Valve 171 has a motor 173 driving a gearbox 175 which preferably has a gear reduction turning in the direction of the arrows. The combination along with a rotary ball valve 177 and internal ball element 179 with a flow opening 181 is shown in the open position, mounted on bracket 183. Bracket 183 includes a roller arm operated microswitch 185 having arm 187 which operates the switch. A shaft or stem and coupling 191 has a cam 189 fixed thereon with opposite lobes oriented to alternately trip switch 185 by alternate contact with arm 187 as shaft 191 rotates, thereby providing a means through connection of the microswitch wires to oil management computer 96 of the control system, to signify when the valve 177 is open or closed as the motor rotates in one direction as shown. Microswitch 185 and cam 187 comprise a position indicating sensor which is adjusted and positioned to send a signal to an appropriate latch as depicted on FIG. 7 when the valve is in a desired open or closed condition of use. Motor and gearbox combination 173, 175 have little drift when power to the motor shut off so that the position sensor 185, 189 truly reflects a full open or full closed position of the valve 177.

Referring to FIGS. 1 and 5, the frying apparatus includes automatic disposal of used oil. Inlet manifold 68 continues past vat 32 in fluid communication with a dispose line 98 which leads to a tee then through another of the electrically operated valves 100 to a disposal reservoir or drum 102. Disposal reservoir 102 is external of the housing and preferably outside. Dispose valve 100 is electrically connected to the control system. The programmed oil management computer 96 is programmed to close the return valves, open dispose valve 100 and operate filter pump 62 in response to operator selection of a dispose function in order to transfer used oil from filter pan 44 through dispose line 98 to disposal reservoir 102. This enables disposal of hot oil without ever pulling the filter pan assembly out of the housing and without handling or moving containers of hot oil.

Disposal reservoir 102 may optionally be equipped with a conventional oil level sensor 103 electrically connected to computer 96 which is programmed to send a message and enter an error routine if sensor 103 indicates the disposal reservoir is full when a dispose oil operation is attempted. Dispose line 98 can optionally include an overpressure sensor 101 in dispose line 98 electrically connected to computer 96 effective to shut off the filter pump 62, 64 in event of a malfunction of dispose valve 100 or return valves 76 such that the filter pump starts working against a dead head because the motor operated valve or valves that should be open did not open, in order to prevent the filter pump motor from burning up. Filter pump 62 is preferably a positive displacement gear pump which may produce pressures up to 200 psi.

The apparatus is also provided with new oil supply line 104 which is fluidly coupled to intake manifold 68 through check valve 106 and dispose line 98. Supply line 104 leads to supply reservoir 108 through supply pump 110. Supply reservoir 108 may be a single tank, an interconnected series of tanks, a drum or any source of new oil. Supply reservoir 108 preferably includes a conventional electrically operated oil level sensor 109 electrically connected to the oil management system computer 96 whereby a signal can be produced indicative of a low oil condition in supply tank 108. Supply line 104 along with the supply pump 110 and the reservoir 108 would normally be located outside the work area and preferably outside the building in which the apparatus is installed. By opening one of the selected return valves and operating supply pump 110, new oil can be supplied to a selected vat.

Figure 6:
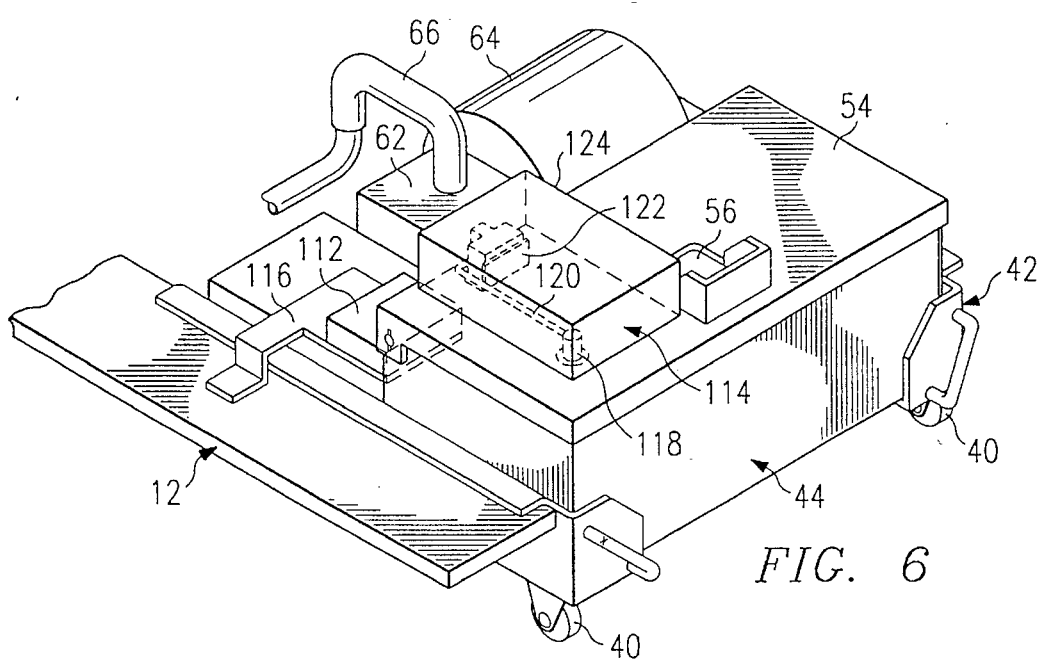
FIG. 6 is a perspective view of the oil filter pan assembly from the left front side.

By reference to FIGS. 2 and 6, the filter pan assembly preferable includes a pan position sensor 112 and an oil level sensor 114 which are electrically connected to said control system. Pan position sensor 112 is mounted on a bracket 116 between a portion of housing 12 and filter pan 44. When filter pan assembly 26 is rolled back into the housing through access opening 24, pan position sensor 112 is responsive to the presence or absence of the filter pan assembly being received in place in the housing. Pan position switch 112 is a limit switch which is monitored to indicate when the filter pan is in proper position so that it oil cannot be drained on the floor.

Figure 4:
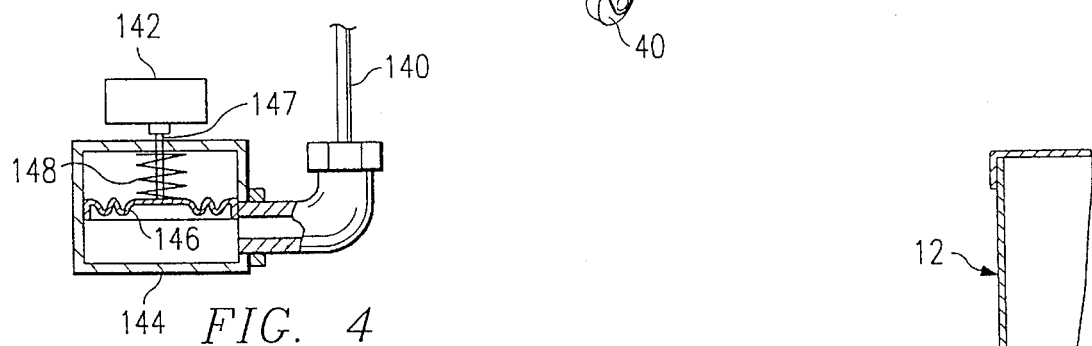
FIG. 4 is a cut-away view of the switch portion of the oil level sensor.

Oil level sensor 114 is responsive to the presence of a substantial quantity of oil in the oil filter pan by altering an electrical circuit connected to the control system. It has a tube portion 118 which depends downwardly through an opening in lid 54. A column of air is trapped which communicates through a tube 120 to a pressure sensitive sensor 122 which may be regarded as a switch portion 122. Switch portion 122 may be a diaphragm operated switch, of the type disclosed in FIG. 4, in electrical connection with the control system. It may be protected by a guard box 124. Sensor 114 enables oil management computer 96 to test for the presence of oil so that filter pan 44 is not over filled during an oil transfer operation. The output side of filter pump 62 may include a one-way flow valve 126 in transfer line 66 and an oil pressure switch 128 operatively connected to the control system to signify pressure indicative of flow. Oil pressure switch 128 is preferably a conventional pressure indicating switch which has a "pickup" pressure that sets the switch at a relatively low pressure such as 5 or 10 pounds per square inch and is preferably followed downstream by a flow restriction 129 which helps ensure that the pickup pressure is achieved even if the output side of line 66 is open as filter pump 62 is transferring oil through an open valve. When filter pump 62 empties filter pan 44 it begins to suck air resulting in a pressure drop at sensor 128 which can be tested to determine that the filter pump should be shut off because filter pan 44 is empty. This "air" indication can result from sensor 128 "dropping out" because the pressure in line 66 has fallen below the pickup pressure and is an indication that the pump is now pumping air instead of oil.

Referring now to FIGS. 1, 3, 4 and 5, each vat is equipped with a level sensor. Vat 28 is equipped with level sensor 130, vat 30 is equipped with level sensor 132 and vat 32 is equipped with level sensor 134. By reference to FIG. 3, level sensor 134 has an opening 136 into the cooking liquid at an elevation which is below the liquid surface indicated by the dotted line 138 in FIG. 5. Opening 136 is below surface 138 by a control distance selected to indicate when the vat is nearly filled to a desired operating level. The level sensors have a tube portion 140 extending from said opening, configured to generate a pressure responsive to the level of cooking liquid above opening 136.

Level sensors 130, 132 and 134 have a switch portion 142 connected to tube portion 140. Tube portion 140 has one end secured at opening 136 in fluid communication with the cooking liquid, extending upwardly above opening 136 to an elevation such that switch portion 142 is not exposed to hot cooking liquid. Tube portion 140 is preferably external to a wall of the vat and configured in an inverted U-shape whereby one leg of the inverted U-shape tube traps air above a column of cooking liquid to generate said pressure. Switch portion 142 has a housing 144 attached to the other end of tube portion 140.

Housing 144 has a diaphragm 146 receiving pressure through tube 140 responsive to the level of cooking liquid. Diaphragm 146 moves to operate said switch through the pressure on diaphragm 146 by means of a connected rod 147 surrounded by spring 148. The diaphragm is biased to operate the switch at a pressure of about two to four inches of water column with opening 136 about three to six inches below the desired operating level of the cooking liquid. Tube portion 140 is preferably located outside the front wall of the vats to avoid interference with baskets that are used for cooking food and shower unit 80. One leg of the inverted U-shaped tube 140 could be inside the vat.

The oil level sensors in the vat are particularly useful during an oil transfer operation and during the fill operation. When oil is being transferred from one vat through the filter pan to another vat, the sensor can be checked by the control system to make sure the vat to which oil is being transferred is empty, so no attempt will be made to double fill a vat. The oil level sensors can be used during the fill operation to sense when the vat is substantially filled to the operating level so that the supply pump is shut off before too much oil is pumped over from the supply reservoir.

Figure 7:
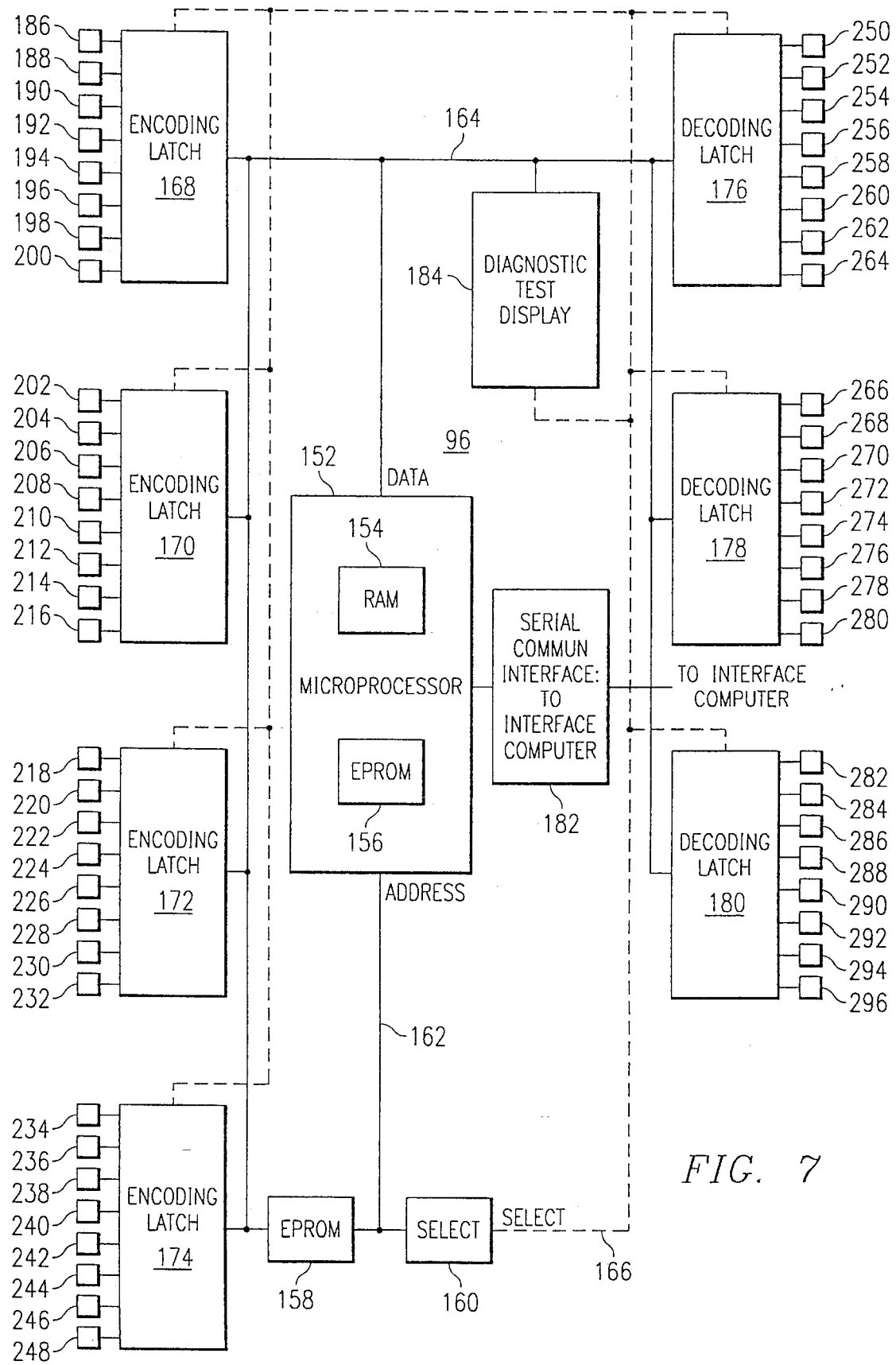
FIG. 7 is a block diagram of the oil management computer.

FIG. 7 represents a block diagram of the oil management computer referred to generally by reference numeral 96. The main component of oil management computer 96 is microprocessor 152. Microprocessor 152 is used to execute the control program of the invention and to store user programmed information. User programmed information may be stored in on-board random access memory ("RAM") 154 build into microprocessor 152, while the invention's control program may be stored in either on-board erasable programmable read only memory ("EPROM") 156 or external EPROM 158, or in a combination of on-board EPROM 156 and external EPROM 158.

Oil management computer 96 also contains encoding latches 168, 170, 172 and 174 and decoding latches 176, 178 and 180. Encoding latches 168, 170, 172 and 174 are used to interface microprocessor 152 with various sensor inputs. The latches code the inputs from the sensors into data that can be placed on data bus 164. Decoding latches 176. 178 and 180 pass instructions from microprocessor 152 to the appropriate output via data bus 164. Select line 166 is used by select decoder 160 to select the particular latch that will place data on, or receive data from data bus 164.

Microprocessor 152 uses address line 162 to call instructions for the control program in external EPROM 158 and to select individual latches using select decoder 160. Data bus 164 carries data from external EPROM 158 and encoding latches 168, 170, 172 and 174 to microprocessor 152 and additionally carries data from microprocessor 152 to decoding latches 176, 178 and 180 and to diagnostic test display 184. Diagnostic test display 184 is used by a service technician in performing maintenance on the unit and is not intended to be seen by a normal user.

Microprocessor 152 receives instructions from interface 94 of FIG. 1 and 5 through serial communication interface 182 which can be an RS-486 communication interface. Serial communication interface 182 is also used by microprocessor 152 to pass messages to interface 94 that are to be displayed to the user.

Encoding latches 168, 170, 172 and 174 each have eight distinct inputs that may connected to various sensors or switches in the system or may unused at this time. Encoding latch 168 has input 186 which can be connected to a redundant level sensor of the same type shown in FIG. 4 which, if installed, can be used as a backup if a level sensor switch installed on a vat fails. Input 188 is attached to pan position sensor 112 from FIG. 5 while input 190 is attached to filter pan oil level sensor 114 from FIG. 2. Input 192 is attached to pressure switch 128, and input 194 is connected to overpressure sensor 101. Inputs 196, 198 and 200 are unused but could be used to receive such inputs as level sensors on the new oil reservoir and dispose reservoir and other inputs that would increase the utility of the system.

Encoding latch 170 has inputs 202, 204, and 206 which are connected to level sensors 130, 132, and 134 of FIG. 5 respectively to detect if the corresponding vats are filled with oil. Inputs 208, 210 and 212 can be connected to other level sensors so that up to six vats can be monitored by oil management computer 96. For systems with less than six vats extra inputs are left unused. Inputs 214 and 216 are not used at this time. Encoding latch 172 has inputs 218, 220 and 222 each of which are connected to a valve position sensor on respective return valves 76 in FIG. 5. Inputs 224, 226 and 228 can be connected to the return valve position sensors on three additional vats. In systems with less than six vats extra inputs are left unused. Input 230 is connected to a valve position sensor for dispose valve 100 of FIG. 1. Input 232 is not used at this time. Encoding latch 174 has inputs 234, 236 and 238 each connected to a valve position sensor on respective drain valves 92 in FIG. 5. Inputs 240, 242 and 244 can be connected to the respective drain valve position sensor on three additional vats. Again, in systems with less than six vats the extra inputs are left unused. Inputs 246 and 248 are not used at this time.

Decoding latch 176 has outputs 250, 252, 254, 256, 258 and 260 each of which are connected to the individual cooking computers of up to six vats and used to turn off a particular cooking computer to prevent heat from being applied to an empty vat during some oil transfer operations. The first three are each connected to a cooking computer (not shown) for vats 28, 30, 32 disclosed herein. For systems with less than six vats the extra outputs are left unused. Outputs 262 and 264 are unused at this time. Decoding latch 178 has outputs 266, 268 and 270 each connected to a motor driver used to open and close respective return valves 76 for vats 28, 30 and 32. Outputs 272, 274 and 276 can be connected to motor drivers for return valves on three additional vats. Output 278 is connected to a motor driver for supply pump 110 from FIG. 5. Output 280 is unused at this time. Decoding latch 180 has outputs 282, 284 and 286 each connected to a motor driver used to open and close respective drain valves 92 for vats 28, 30 and 32. Outputs 288, 290 and 292 can be connected to the motor drivers for the drain valves for three additional vats. In systems with less than six vats, extra outputs for motor drivers are left unused. Output 294 is connected to filter pump motor 64 from FIG. 5 while output 296 is connected to a motor driver for dispose valve 100 of FIG. 5.

Referring now to FIGS. 8 through 18, a description of the operational flow of the preferred embodiment of the invention is given. The preferred embodiment is configured to perform four different oil transfer operations. The four operations are a filter operation, a transfer operation, a dispose operation and a fill operation. The filter operation involves draining oil from a particular vat, filtering the oil and returning the oil to the same vat. The transfer operation involves draining oil from a particular vat, filtering it and returning the oil to a vat different from the vat it was drawn from. The dispose operation involves draining oil from a particular vat, filtering the oil and then pumping it to the disposal reservoir. Lastly, the fill operation involves pumping oil from the new oil reservoir directly into a particular vat.

Figure 8:
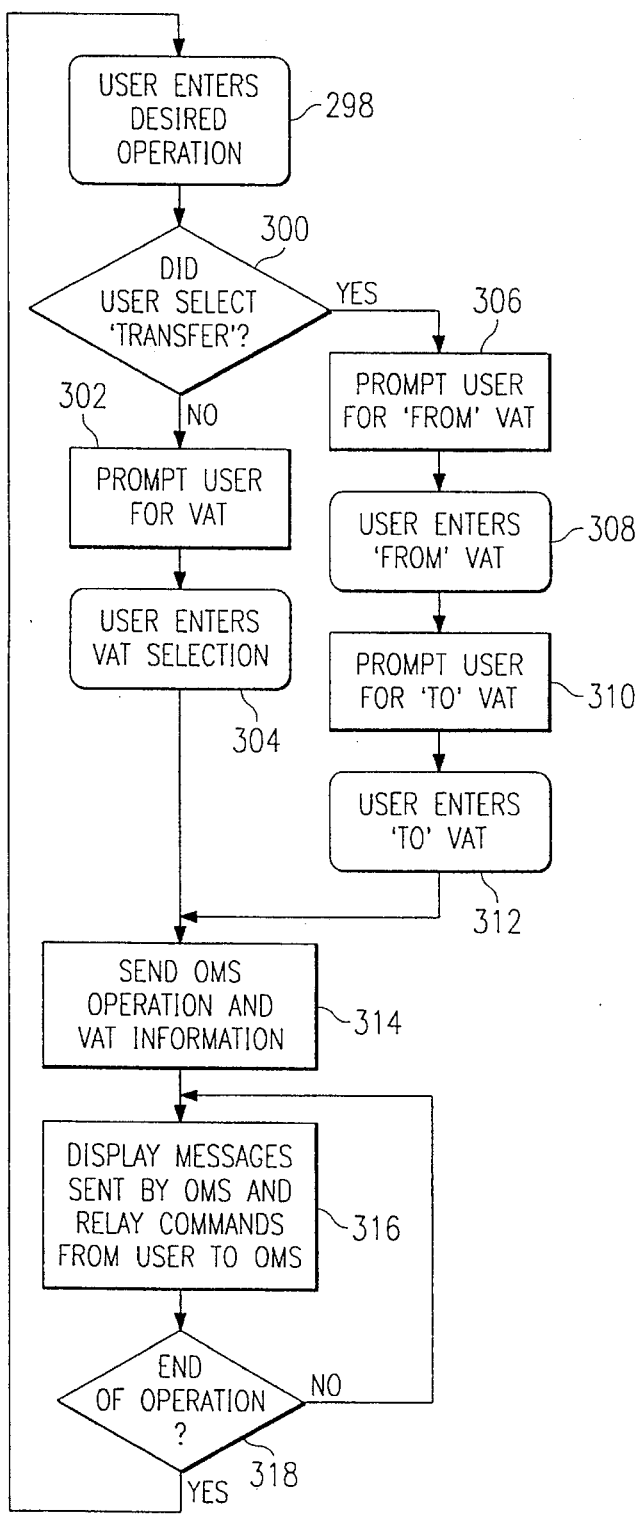
FIG. 8 is a flow chart for the interface computer.

FIG. 8 describes a flow chart representing the operation of interface 94 from FIG. 1. The process begins with block 298 which represents the user entering the desired operation such as filter, transfer, dispose, or fill. The process then passes to decision block 300 which checks to see if the user selected the transfer operation which is the only operation that involves two vats. If the user selected any operation other than transfer, the process passes to block 302 which prompts the user for the vat selection. Block 304 represents the portion of the process where the user enters the vat selection for operations other than the transfer operation. The vat selection tells the process which vat to perform the operation on.

Referring again to decision block 300, if the transfer operation was selected the process passes instead to block 306. Block 306 prompts the user for the "FROM" vat selection representing the vat from which the cooking oil is to be transferred. Block 308 represents the user entering the "FROM" vat. Passing then to block 310 the process prompts the user for the "TO" vat selection representing the vat to which the cooking liquid is to be transferred. Block 312 represents the user entering the "TO" vat.

Both blocks 304 and 312 pass to block 314. Block 314 represents interface 94 taking the operation and vat information and passing that information serially to the oil management computer. After sending the operation and vat information to the oil management computer the process then passes to block 316 which represents making interface 94 act as a transparent pathway for messages from and commands to the oil management computer. All information received in block 316 is passed serially via serial communication interface 182 from FIG. 7. Once a message or command is received or sent the process passes to decision block 318 which checks to see if the operation has been completed. If the operation is complete the process passes back to block 298 which waits for the user to select the next operation. If the process is not complete the process returns to block 316.

Referring now to FIGS. 9 through 18 a description of the main process of the preferred embodiment of the invention will be given. The main process is hierarchal and is comprised of a main loop, subroutines called by the main loop and sequences called by the subroutines.

Figure 9:
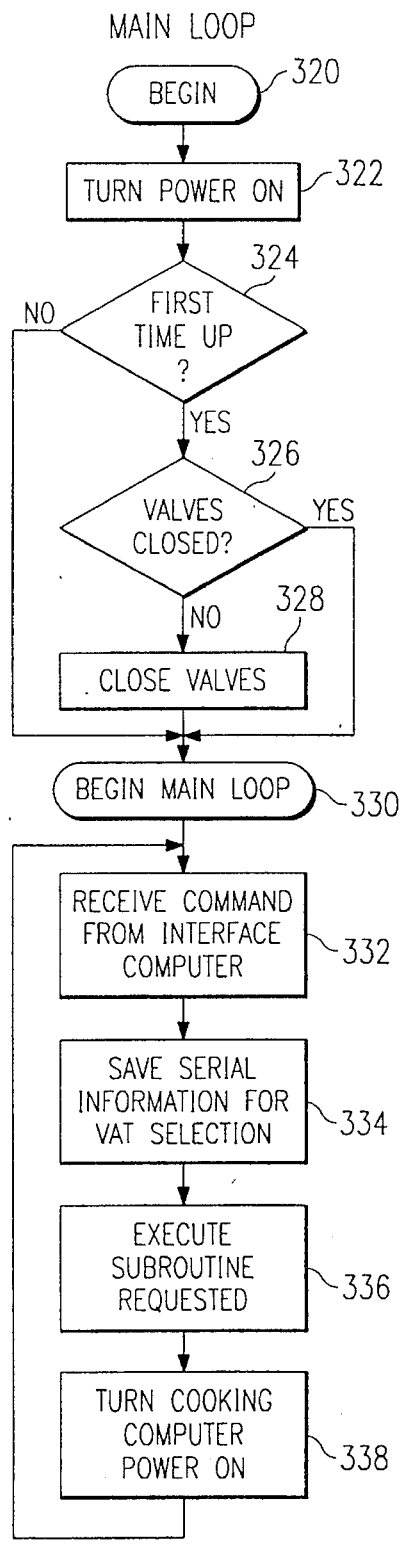
FIG. 9 is a flow chart for the main loop.

FIG. 9 represents the main loop of the process. The process begins with block 320 and passes to block 322 which represents power being applied to the system. The process then determines whether this is the first time the system has been powered up as shown by decision block 324. If this is not the first power up the process begins the main loop as shown by block 330. If this is the first power up the process passes to block 326 which examines the return valve position sensor inputs 218, 220 and 222, the drain valve position sensor inputs 234, 236 and 238, and the dispose valve sensor input 230, all of FIG. 7, to see if all valves are closed. If the valves are closed the process again passes to block 330, otherwise the process closes the open valves by sending a signal to the appropriate motor drivers using outputs 266, 268 and 270 for the motorized return valves 76, outputs 282, 284 and 286 for motorized drain valves 92, and output 296 for the motorized dispose valve 100 as represented by block 328 before passing to block 330.

Block 330, as discussed, represents the beginning of the main loop which passes the process to block 332. Block 332 represents the system receiving the operation and vat information from interface 94 of FIG. 1. Next, block 334 represents storing the information from block 332 in RAM 154 from FIG. 7. The main loop, as shown by block 336, then executes the appropriate subroutine determined by the operation selected by the user. After the process finishes executing the appropriate subroutine the process restores power to the cooking computer, represented by block 338.

Figure 10:
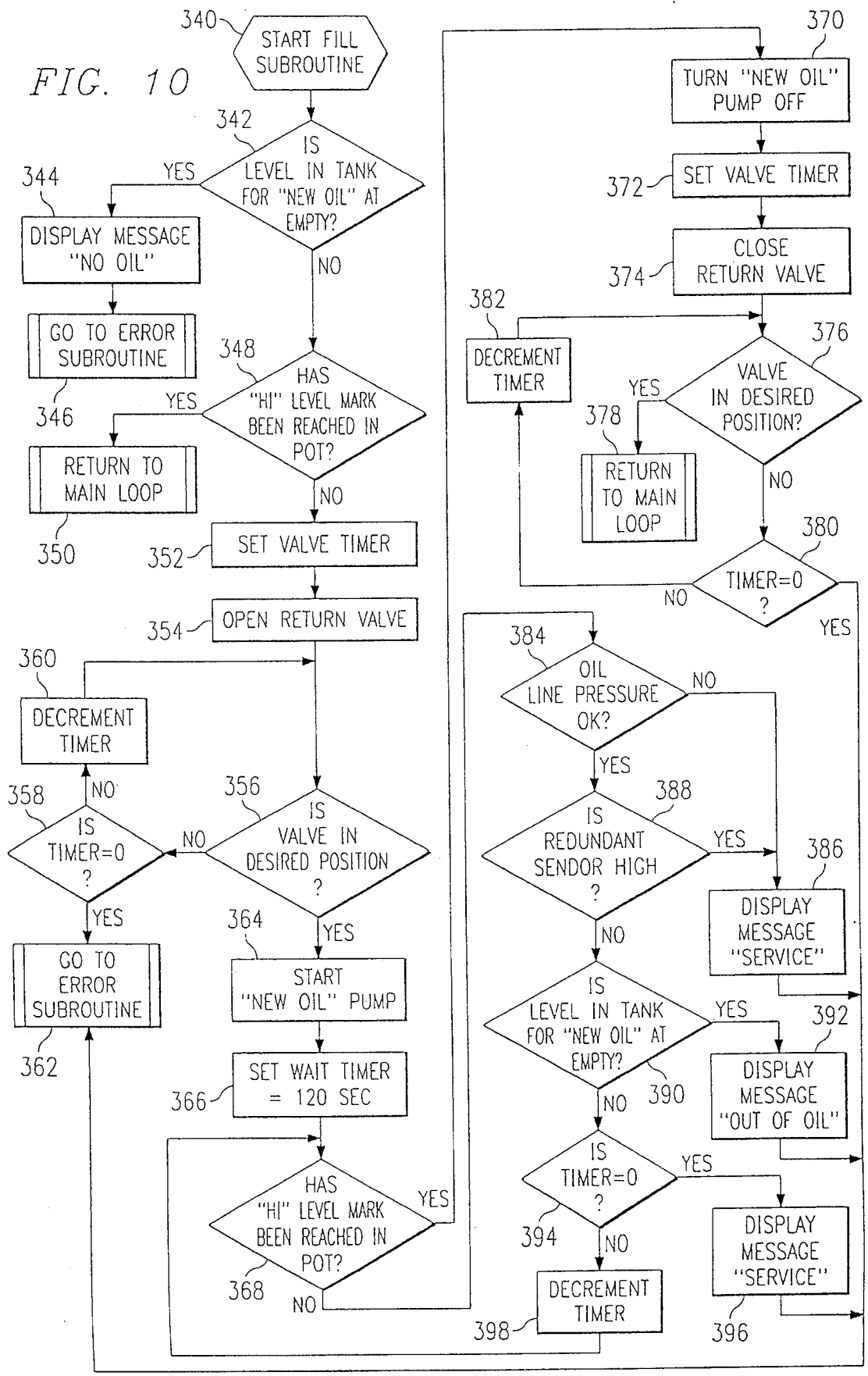
FIG. 10 is a flow chart for the fill subroutine.

The first of the subroutines that can be called by the main loop is the fill subroutine shown in FIG. 10. Block 340 represents the beginning of the fill subroutine which preferably proceeds to decision block 342 if an optional conventional electrical oil level sensor is installed in the oil supply reservoir and connected to the oil management computer, otherwise the process passes directly to block 348 from block 340. Decision block 342 represents the checking of the sensor described above by the oil management computer 96 to see if the new oil reservoir is empty. If empty, the process passes to block 344 which causes "NO OIL" to be displayed on interface 94 before calling the error subroutine as represented by block 346. Referring back to decision block 342, if the new oil tank is not empty the process passes to decision block 348 which reflects determining by means of oil level sensors 130, 132, and 134 if the pot, or vat, to be filled is already full. If the vat is already full the process returns to the main loop, shown by block 350.

If the vat to be filled is not already full, block 348 passes the process to block 352 which sets the valve timer. The valve timer is simply a preprogrammed amount of time allowed by the process to represent the maximum time for a valve to change positions. When set, the valve timer is not changed until decremented. The valve timer, after being set, is decremented by the process until the valve reaches its proper position as determined by the appropriate valve position sensor, or the valve timer reaches zero. A valve that will not change positions before the valve timer reaches zero needs to be serviced. Referring back to block 352, after the timer is set a signal is sent to open a selected return valve 76, represented by block 354, by starting the appropriate valve motor. After the valve motor is started the process passes to decision block 356 which represents the sampling of the particular valve position sensor to see if the valve is in the desired position. If the valve is in the proper position, the valve motor is stopped.

If the valve is not in the desired position the process passes to decision block 358 which checks the valve timer to see if it has reached zero. If the timer has not reached zero the timer is decremented depicted by block 360 and the process returned to decision block 356. If at block 358 the timer has reached zero before the selected return valve 76 has opened, the process passes to block 362 which call the error subroutine of FIG. 18 indicating that the particular valve has malfunctioned.

Referring again to decision block 356, if the selected return valve 76 is determined to be in the proper position the process starts new oil pump 110 as shown by block 364. The process then sets the wait timer represented at block 366. The wait timer is another preprogrammed amount of time used by the process which represents the maximum amount of time that should be required to fill the selected vat. The wait timer functions in the same manner as the valve timer. After the wait timer is set, the process passes to decision block 368 which represents checking level sensors 130, 132 or 134 to see if the selected vat 28, 30 or 32 is full. If the selected vat is full the process passes to block 370 which turns the new oil pump 110 off by sending a signal from oil management computer 96 through output 278. After the pump is turned off the process again sets the valve timer, shown in block 372 and closes selected return valve 76 using a signal from oil management computer 96, as represented by block 374. The process, as it does when all valves are open or closed, checks to see if the valve is in the proper position by sampling the appropriate valve position sensor, as shown in decision block 376. If the valve position sensor indicates that the valve is closed the process passes back to the main loop through block 378. If the valve has not closed the valve timer is checked as represented by block 380. If the timer is determined to be zero the process calls the error subroutine through block 362. If the timer is not yet zero the process decrements the timer, as shown at block 382, before returning to decision block 376.

Returning to decision block 368, if the selected pot is not yet full, meaning that the level sensor associated with the selected pot is off, the process passes to decision block 384 which represents determining if the line pressure is below the overpressure limit as sensed by overpressure sensor 101 and inputted to oil management computer 96 through input 192. If the line pressure is above the overpressure limit set by overpressure sensor 101 the process has the message "SERVICE" displayed as shown in block 386 before calling the error subroutine, shown in block 362. If the line pressure is below the overpressure limit, the process, represented by block 388 may check an optional redundant level sensor, which can be present on the selected vat and connected to the oil management computer 96 through input 186, to see if the redundant level sensor is on, meaning the vat is actually full. Vats may or may not be equipped with additional or redundant level sensors of the type shown in FIG. 4. If the redundant level sensor is not installed the process skips to block 390. If the redundant level sensor is installed and shows a full condition of the selected vat, the process again passes to block 386.

If the redundant level sensor is not on to show a full condition of the selected vat, the process can check to see if the new oil tank has been emptied, if a level sensor is installed in the supply reservoir 108, shown in decision block 390. If the tank has been emptied as shown by an input from the optional level sensor, the process has the message "OUT OF OIL" displayed, as shown in block 392 before calling the error subroutine in block 362. If the new oil tank is not empty the process checks the wait timer, shown by block 394. If the level sensor is not installed in supply reservoir 108 the process skips from block 388 directly to block 394 where the value of the wait timer is checked. If the wait timer is equal to zero the process passes to block 396 which displays the message "SERVICE" and calls the error subroutine through block 362. If the timer is not zero the process decrements the timer, represented by block 398 before returning to decision block 368.

Figure 11:
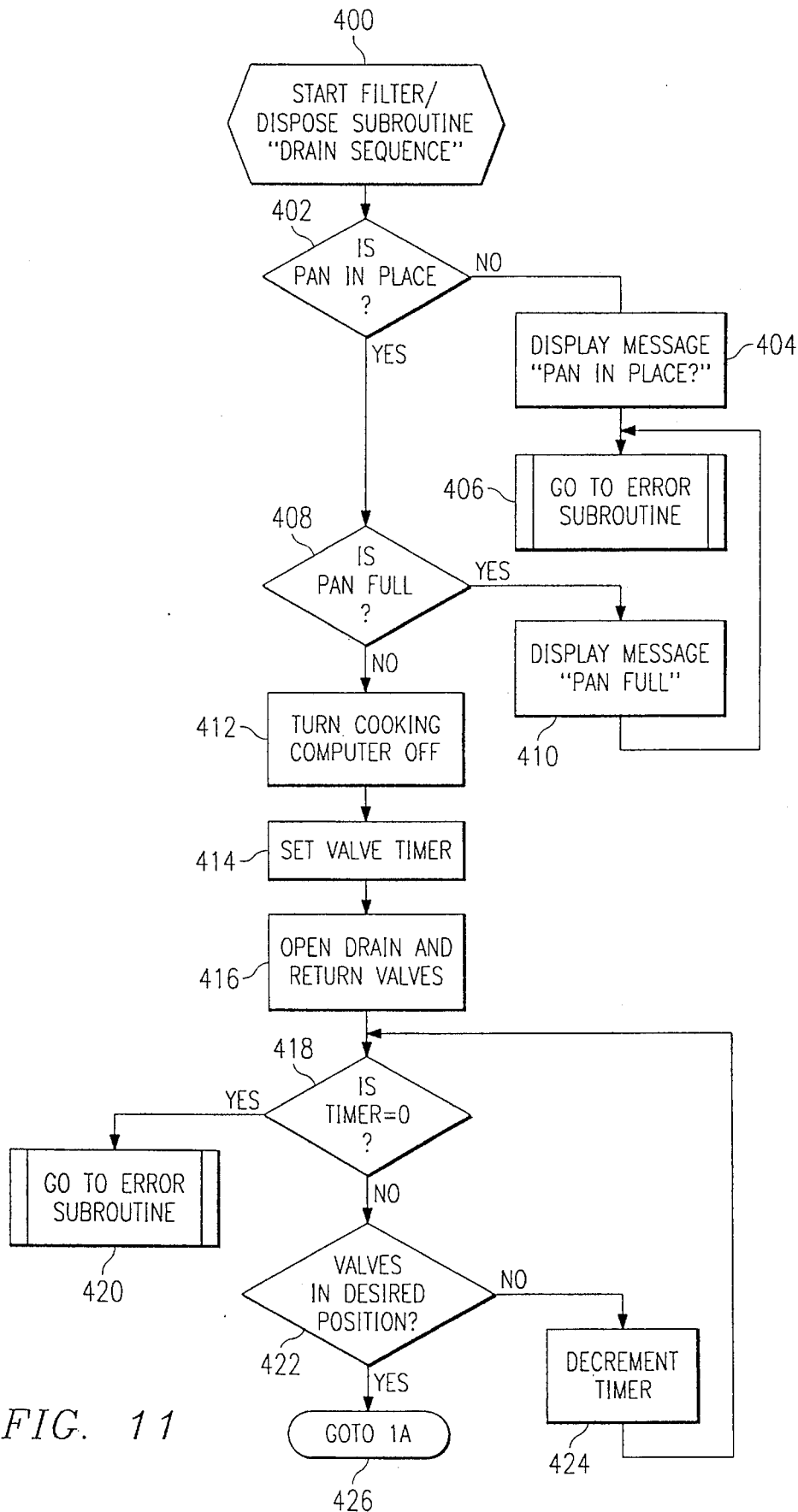
FIGS. 11 and 12 are a flow chart for the drain sequence of the filter/dispose subroutine.
Figure 12:
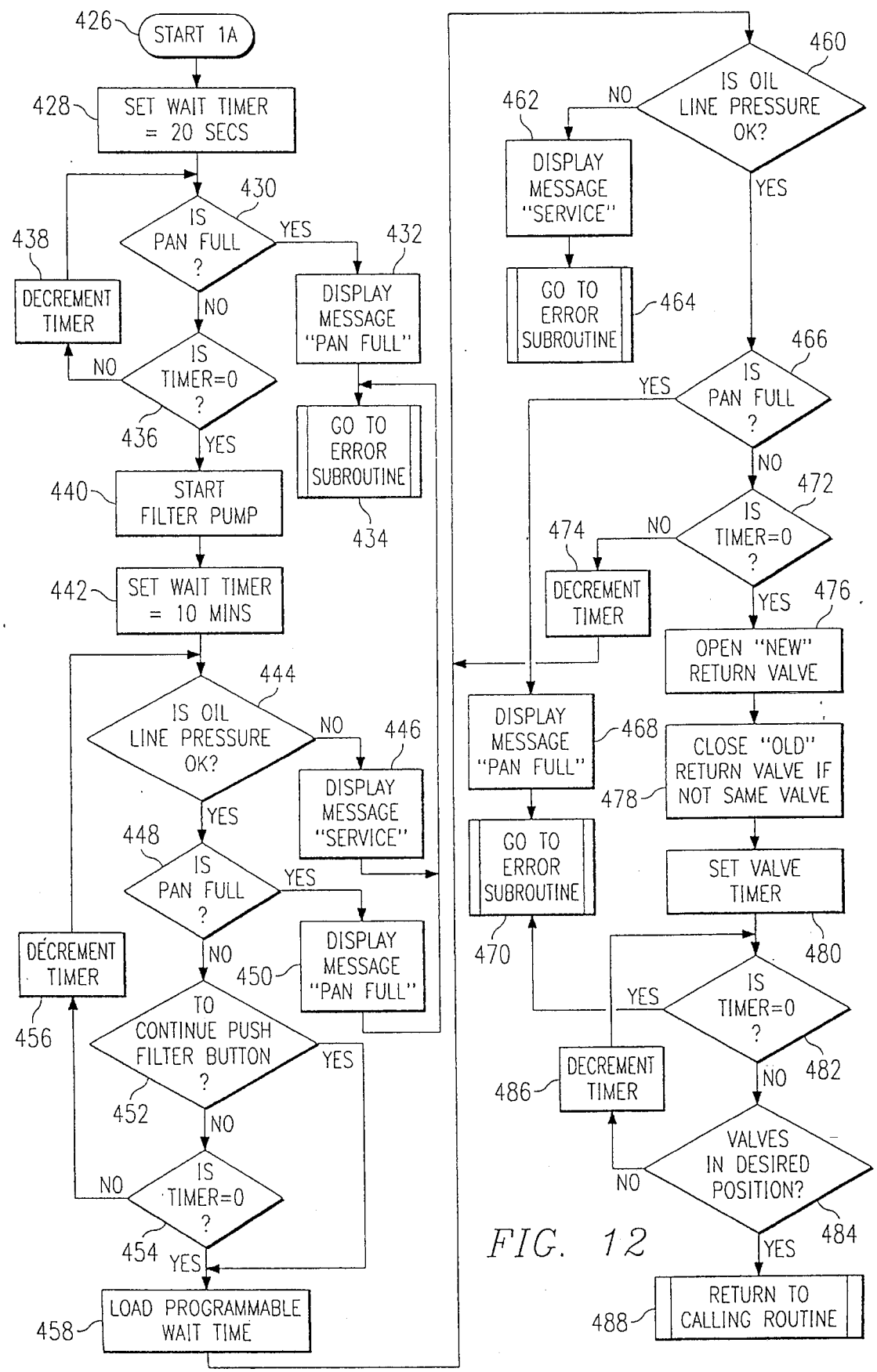

Referring now to FIGS. 11 and 12, the drain sequence which is called by the filter, transfer and dispose subroutines is described. In FIG. 11, block 400 represents the start of the drain sequence after being called by a subroutine. Block 400 passes the process on to decision block 402 which represents a determination of if filter pan 44 is in place preferably using filter pan position sensor 112 in communication with oil management computer 96 through input 188. If the filter pan position 112 sensor is off, meaning the pan is not in place, the process displays the message "PAN IN PLACE?" according to block 404 before calling the error subroutine as shown by block 406. If the pan is in place the process proceeds to decision block 408 which represents determining if the pan is full by sampling input 190 which is connected to filter pan oil level sensor 114. If filter pan oil level sensor 114 is on, indicating that the filter pan 44 is full, the message "PAN FULL" is displayed according to block 410 before calling the error subroutine in block 406.

Once the pan has been determined to be in place and not full, the conventional cooking computer of the selected vat is turned off by oil management computer 96 sending a signal through appropriate output 250, 252 or 254, as represented by block 412, ensuring that the heating means is not active during oil transfer operations. The process then proceeds to block 414 which represents setting the valve timer and then to block 416 which represents opening of the drain and return valves according to methods already discussed for the specified vat. The valve timer setting represents a preprogrammed amount of time. As with all valve operations, the valve timer is checked to see if it is equal to zero, represented by block 418, and the error subroutine called if the valve timer is equal to zero, shown by block 420. If the valve timer is not zero the selected return valve 76 and drain valve 92 are checked by looking at their position sensors to see if they are in the desired position depicted by decision block 422. If they have not reached the desired position the timer is decremented as represented by block 424 and the process returns to block 418. If the valves have reached their desired position, indicated by a change in the appropriate input 218, 220 or 222 and corresponding input 234, 236 or 238 respectively, the process passes to 1A in block 426. In all motorized valve operations it is understood that the valve drive motor is turned off when the valve reaches the desired open or closed position.

In FIG. 12, 1A, shown by block 426, passes the process to block 428 which represents setting the wait timer to a value representing 20 seconds. After the wait timer is set the process checks to see if the filter pan 44 is full using filter pan level sensor 114 and input 190 in decision block 430. If the pan is full, indicated by filter pan level sensor 114 being on, the process displays "PAN FULL" in block 432 before calling the error subroutine in block 434. If the pan is not full, filter pan level sensor 114 is off, decision block 436 represents checking to see if the wait timer is equal to zero. If the wait timer is not equal to zero the process passes to block 438 which decrements the wait timer and then returns to decision block 430. If the wait timer is equal to zero the process passes to block 440 which depicts filter pump 62 being turned on by a signal to the pump drive motor from oil management computer 96 through output 294.

After filter pump 62 is turned on, the wait timer is set to a value representing 10 minutes represented by block 442. The wait timer at block 442 is provided to give the user time to clean the pot and ensure that there is no blockage in the selected vat drain line. The process then passes to decision block 444 which represents determining if overpressure sensor 101 senses a line pressure above the overpressure limit. If the line pressure is above the overpressure limit, the process displays the message "SERVICE" in block 446 and then calls the error subroutine in block 434. If the overpressure sensor 101 does not detect a line pressure over the limit the process passes to decision block 448 which depicts checking filter pan level sensor 114 to see if filter pan 44 is full. If filter pan 44 is full the message "PAN FULL" is displayed by interface 94, shown by block 450, and the error subroutine is called at block 434. If filter pan 44 is not full, decision block 448 passes the process to decision block 452 which represents checking to see if the user has pressed a button on interface 94 corresponding to the filter operation. The user may push the filter button before the wait timer of block 442 has expired if the cleaning operations are complete and the process can continue. If the filter button has been pressed the process proceeds to block 458. If the filter button has not been pressed the wait timer is checked as represented by decision block 454. If the wait timer is not equal to zero it is decremented as represented by block 456 and the process is returned to decision block 444. If the timer is equal to zero the process continues on to block 458.

Block 458 represents the loading of another wait timer which is programmable for a wait time by the user and then passes the process to decision block 460. The wait timer is changed by decrementing as indicated through block 474. Decision block 460 represent checking overpressure sensor 101 and if the line pressure is above the overpressure limit interface 94 displays the message "SERVICE", shown in block 462, before calling the error subroutine of FIG. 18 at block 464. If line pressure is within the normal limits, decision block 466 represents determining if filter pan level sensor 114 is on indicating that filter pan 44 is full. If filter pan 44 is full the process displays the message "PAN FULL" at interface 94, as indicated by block 468, and then passes the process to the error routine represented by block 470. If filter pan 44 is not full, meaning that filter pan oil level sensor 114 is off, the wait timer is checked as indicated by decision block 472, which if the wait timer is not equal to zero, passes to block 474 to decrement the wait timer before returning to decision block 460.

If the wait timer is zero in decision block 472 the process is passed to block 476 which represents the opening of selected return valve 76 of the vat to which the oil is to be returned. The process then passes to block 478 which represents closing return valve 76 of the old vat if the vat the oil is being returned to is not the same one from which it was drained. After return valves 76 are set in motion by a signal from oil management computer 96 through the appropriate output 266, 268 or 270, the valve timer is set as indicated by block 480 and the timer checked as represented by decision block 482. If the valve timer in decision block 482 is equal to zero, the error subroutine is called by block 470. If the timer is not equal to zero the selected return valve(s) 76 is checked by looking at the appropriate valve position sensors to see if the selected return valve(s) 76 has arrived in the desired position, as shown by decision block 484. If the selected return valve(s) 76 is not yet in the desired position the valve timer is decremented as indicated by block 486 which then returns the process to decision block 482. If the process in decision block 484 determines that the selected return valve(s) 76 is in the desired position the process is returned through block 488 to the subroutine that called the drain sequence.

Figure 13:
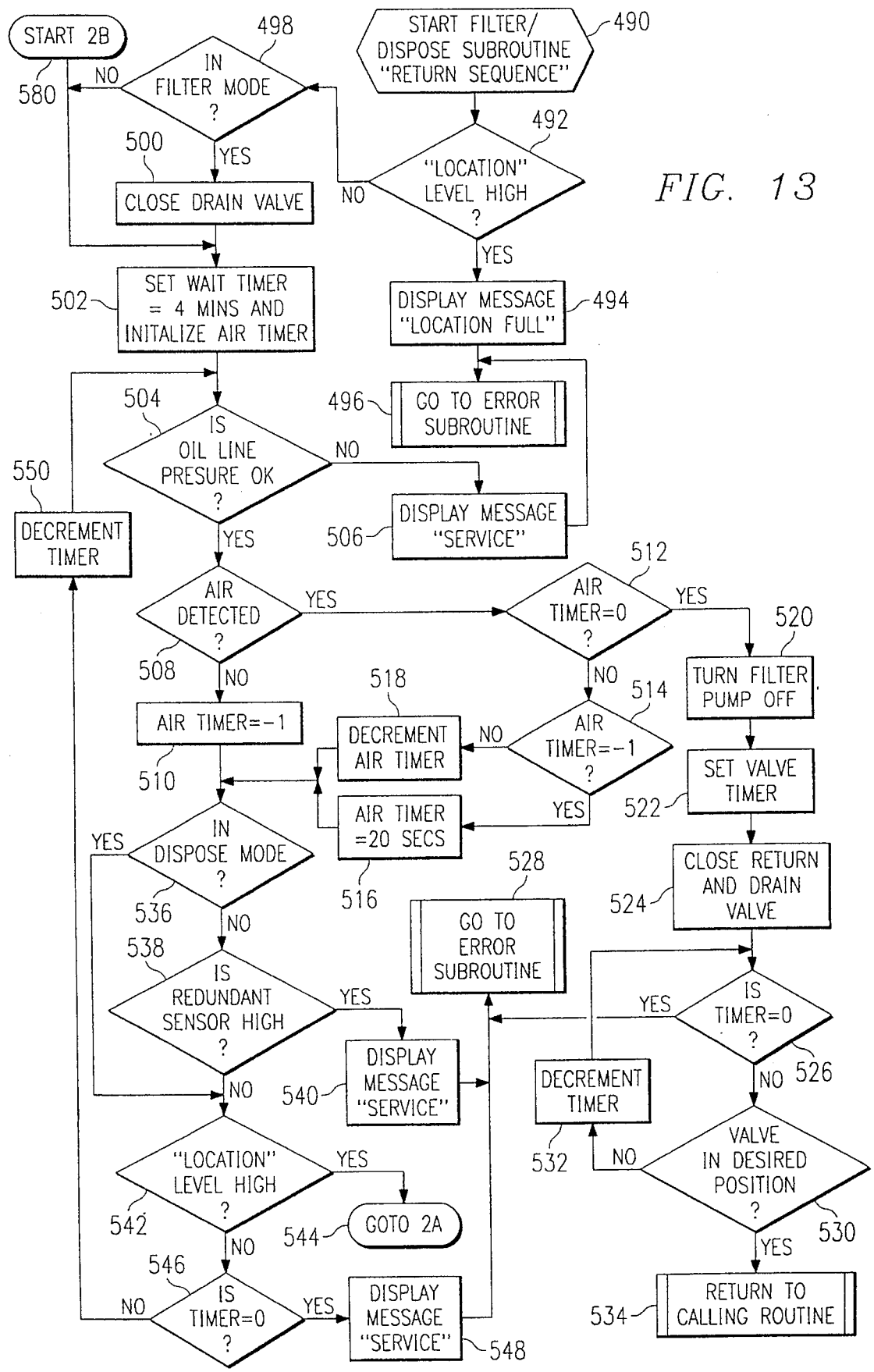
FIGS. 13 and 14 are a flow chart for the return sequence of the filter/dispose subroutine.
Figure 14:
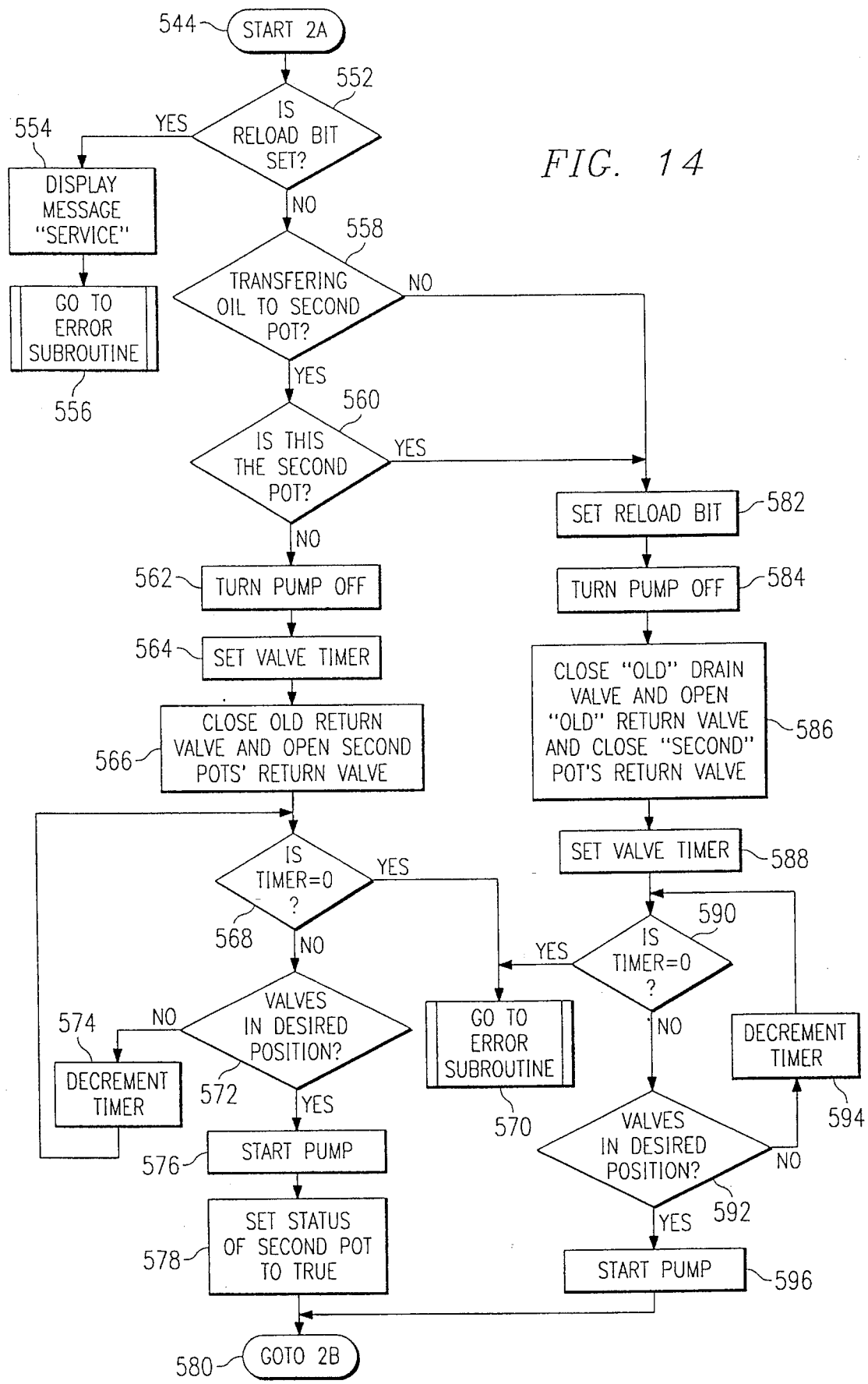

Referring now to FIGS. 13 and 14 the return sequence that is called by several subroutines is described. Block 490 in FIG. 13 represents the beginning of the return sequence and passes the process to block 492 which represents determining if the selected vat to return oil to is full as indicated by its level sensor 130, 132 or 134 being on. If the selected vat is full the process displays "LOCATION FULL" as shown in block 494 before calling the error subroutine in block 496. If the selected vat the oil is to be returned to is not full, decision block 498 represents checking the information stored as represented by block 334 to see if the system is in a filter operation. If the system is in a filter operation the process closes selected drain valve 92 using a signal from oil management computer 96 through appropriate output 282, 284 or 286, as shown by block 500 before proceeding to block 502, otherwise the process passes directly to block 502.

Block 502 shows a wait timer being set to a value representing 4 minutes and the "air" timer being initialized before proceeding to decision block 504. The air timer is used in conjunction with oil pressure switch 128 to determine if filter pump 62 is pumping oil or air. If oil pressure switch 128 is off, filter pump 62 is pumping air, conversely, if oil pressure switch 128 is on, filter pump 62 is pumping oil. The air timer is another variable used by oil management computer 96 to keep track of if and for how long filter pump 62 has been pumping air. Decision block 504 represents checking the line pressure, and if the line pressure is above the acceptable limit "SERVICE" is displayed by block 506 before the error subroutine is called by block 496. If the line pressure is acceptable the process continues to decision block 508 which depicts determining if air has been detected by checking the output of oil pressure switch 128. Oil pressure switch 128 is off when air is being pumped. If air is not detected, oil pressure switch 128 is on, the process passes to block 510 which represents setting the air timer to negative one and then proceeds to decision block 536.

Returning to decision block 508, if air is detected by oil pressure switch 128 being off, the air timer is checked by decision block 512. If the air timer is not zero the air timer is checked to see if it is equal to negative one (−1) represented by decision block 514. If decision block 514 finds the air timer is equal to negative one the air timer is set to a value representing 20 seconds as indicated by block 516, or if the air timer is found not to be equal to negative one the air timer is decremented by block 518. Both blocks 516 and 518 pass the process to block 536.

If, referring again to decision block 512, the air timer is equal to zero, filter pump 62 is turned off by a signal from oil management computer 96 through output 294, represented by block 520, and then the valve timer is set as indicated by block 522. Block 524 then shows oil management computer 96 initiates the closing of the selected return valve 76 and "old" drain valve 92 and passes the process to decision block 526. Decision block 526 represents checking the valve timer and if the valve timer is equal to zero the process calls the error subroutine in block 528. If the valve timer is not equal to zero the selected valves 76 and 92 are checked by the appropriate valve position sensors to see if they have reached the desired position, shown in decision block 530. If the selected valves are not in the desired position the valve timer is decremented as shown by block 532 and the process returned to decision block 526. If the selected valves 76 and 92 were in the desired position, the process returns to the calling subroutine through block 534.

Returning to decision block 536, arrived at from block 510, 516 or 518, the process checks the information received from interface 94 and stored in RAM 154, represented by block 334 of FIG. 9, to see if the system is in dispose mode. If the system is in dispose mode the process skips to decision block 542. If the system is not in dispose mode, decision block 536 passes the process to decision block 538 which represents checking a redundant level sensor if one is installed and connected to input 186 of oil management computer 96. If a redundant level sensor is in place and senses that the vat it is connected to is full, the process passes to block 540 which displays the message "SERVICE" before calling error subroutine shown in block 528. If a redundant level sensor is not installed or does not indicate a full vat, the level sensor 130, 132 or 134 associated with the selected vat 28, 30 or 32 is checked as represented by block 542 to see if it shows the selected vat to be full. If the selected vat is shown to be full by the appropriate level sensor 130, 132 or 134, the process passes to 2A of FIG. 14 through block 544. Alternatively, if the selected vat is not shown to be full, the process checks the wait timer in decision block 546. If the wait timer is equal to zero "SERVICE" is displayed by block 548 before the process calls the error subroutine, represented by block 528. If the wait timer is not equal to zero it is decremented, shown by block 550, before the process returns to decision block 504. The process described by blocks 508 through 550 ensures that when oil is returned from the filter pan to a vat, the oil is pumped by filter pump 62 until either the vat is full or the pump has pumped air continuously for 20 seconds. When either condition occurs the process is allowed to continue.

Referring now to FIG. 14, block 2A is shown by reference numeral 544. The process proceeds from block 2A to decision block 552 which represents determining if a reload bit has been set. The reload bit is a variable used by the process to coordinate transfers to a vat other than the original. If the reload bit is already set the message "SERVICE" is displayed as shown by block 554 before the error subroutine is called by block 556. If the reload bit has not been set the process passes from decision block 552 to decision block 558 which depicts determining if the oil to be returned is being transferred to a second pot, or vat, other than the vat from which the oil was drained. The term pot is another word for vat 28, 30, 32. If the oil is not intended for a second pot the process passes to block 582.

If the oil is being transferred to a second pot the process passes to decision block 560 which signifies determining if the system has accessed the second pot, meaning that a variable has been set to "true" which is done in block 578 discussed below. If the system has accessed the second pot the process again proceeds to block 582. Otherwise the process continues to block 562 which represents the oil management computer 96 sending a signal through 294 to turn filter pump 62 off. The process then proceeds to block 564, setting the valve timer, and block 566 which initiates the closing of the old return valve 76 and opening of the new, or second pot's, return valve 76. The valve timer is then checked in block 568 to see if it is equal to zero. If the valve timer is equal to zero the process calls the error subroutine shown in block 570. If the valve timer is not equal to zero the selected return valve's positions are checked, as shown by decision block 572. If the selected return valves are not in the proper position the valve timer is decremented as indicated by block 574 before returning to block 568. If the selected return valves are found to be in the desired position as indicated by their respective valve position sensors, as represented by decision block 572, the process continues to block 576. Block 576 represents oil management computer 96 restarting filter pump 62. After filter pump 62 is restarted, the system sets the variable to "true" that indicates the second vat's return valve 76 is now open and the second pot is ready to be filled, as shown by block 578. The process is passed through block 2B to block 580 of FIG. 13 which sends the process to block 502.

Returning to block 582 which is reached from blocks 558 or 560, the process sets the reload bit variable and then turns filter pump 62 off, as shown at block 584. The process then moves to block 586 which represents the closing of the old drain valve 92, the opening the old vat's return valve 76, and closes the second pot's return valve 76. The process then sets the valve timer, as shown by block 588 and checks the valve timer as represented by decision block 590. If the valve timer is equal to zero the process calls error subroutine in block 570, otherwise the process checks the valves represented by block 586, using their valve position sensors, to see if they are in the desired position, as shown by decision block 592. If the selected valves of block 586 have not reached their desired position the valve timer is decremented as shown by block 594 before returning to block 590. If said valves have reached their desired position as indicated by their valve position sensor, filter pump 62 is started as represented by block 596 before the process passes to block 502 in FIG. 13 through block 580.

Figure 15:
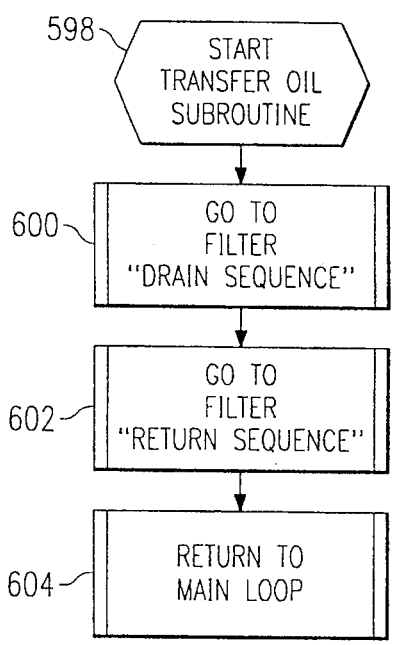
FIG. 15 is a flow chart for the transfer oil subroutine.

FIG. 15 shows the transfer oil subroutine that can be called by the main loop of FIG. 9. The transfer oil subroutine begins in block 598 and proceeds to block 600 which calls the drain sequence described in FIGS. 11 and 12. Upon return from the drain sequence the subroutine processes through block 602 to call the return sequence described in FIGS. 13 and 14. Finally, when the return sequence is complete, the subroutine returns to the main loop through block 604.

Figure 16:
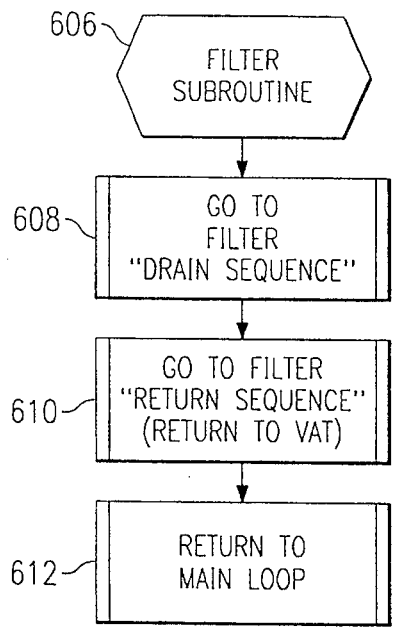
FIG. 16 is a flow chart for the filter subroutine.

Similarly, the filter subroutine shown in FIG. 16 can be called by the main loop. The filter subroutine begins in block 606 which proceeds to block 608. Block 608 represents calling the drain sequence of FIGS. 11 and 12. After the drain sequence returns control to the filter subroutine, the subroutine passes control to block 610 which shows calling the return sequence. As before, when control returns from the sequence the process passes back to the main loop through block 612.

Figure 17:
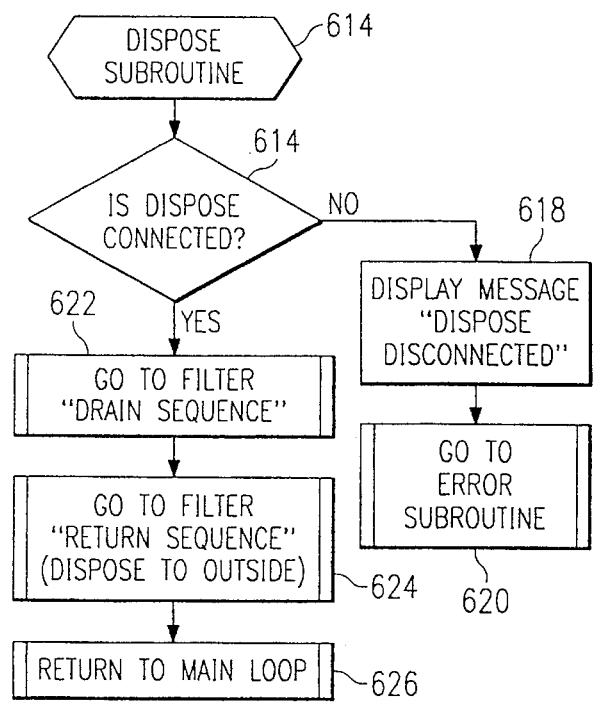
FIG. 17 is a flow chart for the dispose subroutine.

The dispose subroutine of FIG. 17 begins at block 614 which passes control to block 616. Decision block 616 represents checking an optional switch input that can be connected to a spare input of encoding latch 168, to see if disposal reservoir 102 is attached to the system. If the process determines that the disposal reservoir 102 is not connected, the optional switch is off, the message "DISPOSE DISCONNECTED" is displayed at interface 94, represented in block 618, before the error subroutine is called in block 620. If at decision block 616 it is determined that disposal reservoir 102 is connected, the process passes to block 622 which calls the drain sequence of FIGS. 11 and 12. If the optional switch is not installed the process passes directly from block 614 to 622. The process passes to the filter drain sequence of FIGS. 11 and 12. Once control is passed back from the drain sequence to the subroutine, the process continues to block 624 which shows the calling of the return sequence of FIGS. 13 and 14. Finally, when the return sequence is complete the process returns to the main loop as shown by block 626.

Figure 18:
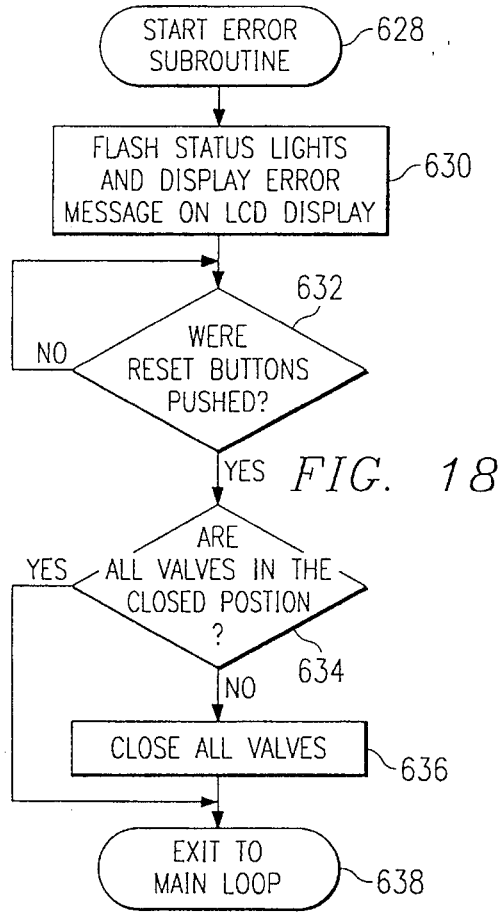
FIG. 18 is a flow chart for the error subroutine.

The error subroutine which can be called from anywhere in the process to handle failures in the system is shown in FIG. 18. The error subroutine begins in block 628 and proceeds to block 630 which flashes the status lights and displays the appropriate error message using interface 94. The system then waits for the reset button on interface 94 to be pressed as represented by block 632. Once the reset is pressed and interface 94 passes the input to oil management computer 96 through serial communication interface 182, the process continues to block 634 representing determining the status of all valves 76, 92 and 100 by sampling the valve position sensors connected to inputs 218, 220, 222, 230, 234, 236 and 238 of oil management computer 96. If all valves 76, 92 and 100 are closed the process returns to the main loop through block 638. If all valves 76, 92 and 100 are not closed the process then closes all valves by having the oil management computer 96 sending signals to the appropriate outputs, represented by block 636, before returning to the main loop in block 638.

In the best mode, the electrically operated valves are made from series 86 ball valves which can be supplied by Gemini Valve Company, Raymond, N.H., the gear drive and motor are 24 volt D.C. reduced to about 10 rpm available as part 80807SC1006 from Crouzet Company, 3237 Commander Drive, Carrollton, Tex. 75006, and the microswitch part of the positioner is available from Carlton Bates Company, 5153 Interstate Drive, Shreveport, La. 71109. Additionally, the microprocessor in the oil management computer is an HC11 E1 microporcessor manufacured by Motorola, Inc., Schamburg, Ill. The EPROM can be a 250K 250 nanosecond EPROM available from Advanced Micro Devices, Sunnyvale, Calif. The encoding latches are octal transparent 3 state latches known in the art as part umber 74HC573 and the decoding latches are octal D flip-flop, 3 state known by part number 74HC574, both available from Motorola, Inc.

We claim:

1. Deep fat frying apparatus comprising:
    a floor supportable housing having a pair of opposite sidewalls, a front wall, an open lower end, a lower internal portion, an upper internal portion positioned directly above said lower internal portion, and an access opening through said front wall into said lower internal portion for receiving an oil filter pan assembly;
    a plurality of frying vats each adapted to receive and heat a cooking liquid in which food items may be cooked, such plurality of frypots being mounted in a closely adjacent side-by-side relationship within the upper internal portion of said housing, each of said frying vats having an upper cooking portion with a narrowed well portion depending therefrom;
    a heating system which heats the cooking liquid in each vat;
    an oil filter pan assembly receivable within the lower internal portion of said housing, said filter pan assembly having a filter pan with a top inlet opening, a bottom wall from which a drainage sump depends, front, rear, and side walls which form a reservoir sized to receive and hold the entire cooking fluid content of a frying vat and a cooking fluid filter element operatively carried by said reservoir in order to filter cooking fluid passing between said inlet and said drainage sump;
    a filter pump and drive motor operatively associated with said filter pan assembly, the pump having an inlet communicating with the interior of said drainage sump and an outlet connected to a transfer line operable to convey oil under pressure through the transfer line to an oil distribution system;
    an oil distribution system comprising each vat having an electrically operated drain valve fluidly coupled to a drain line leading to the inlet of the oil filter pan assembly when it is received in the housing and each vat having a return line and an electrically operated return valve fluidly coupled to the transfer line leading from the filter pump;
    a control system having circuits interconnecting said electrically operated valves and filter pump comprising a programmed oil management computer having an interface for selecting oil transfer functions, displaying messages, receiving operator selections and converting operator inputs into signals effective for operating said electrically operated valves and filter pump in sequence in order to transfer oil to or from a selected vat and the filter pan assembly.

2. The combination of claim 1 wherein each of said electrically operated valves is equipped with a position indicating sensor operatively connected to said control system, each valve having an initial closed position sensed by the control system before any oil transfer function is attempted in response to operator selection of an oil transfer function.

3. The combination of claim 1 or 2 wherein the oil filter pan assembly or housing includes a pan position sensor electrically connected to said control system, the pan position sensor being responsive to the presence of the oil filter pan assembly being received in place in the housing, the oil management computer being programmed to test the pan position sensor before opening any of said electrically operated drain valves and entering an error routine if the oil filter pan is not in place so that hot oil will not be drained onto the floor.

4. The combination of claim 1 or 2 wherein each of said vats has an oil level sensor electrically connected in a circuit to said control system, each of the oil level sensors being responsive to the presence of a substantial quantity of oil in a vat by electrically altering its circuit, the oil management computer being programmed to test said circuits before opening the electrically operated return valve on a selected vat in response to an operator selected oil transfer function for transferring oil to the selected vat, the control system entering an error routine if the oil level sensor in the selected vat indicates that said substantial quantity of oil is already present, to prevent double charging of said vat with oil.

5. The combination of claim 2 wherein the electrically operated valves comprise a rotary valve driven by an electric motor and gearbox, the rotating portion of said rotary valve having a cam which operates a microswitch connected to the control system to indicate when the valve is in an open or closed position.

6. The combination of claim 5 wherein the rotating portion of the valve is driven in one direction of rotation, said cam having opposite extending cam surfaces that alternately operate an arm extending from the microswitch during rotation to indicate alternate open or closed positions of the valve.

7. Deep fat frying apparatus comprising:
    a floor supportable housing having a pair of opposite sidewalls, a front wall, an open lower end, a lower internal portion, an upper internal portion positioned directly above said lower internal portion, and an access opening through said front wall into said lower internal portion for receiving an oil filter pan assembly;
    a plurality of frying vats each adapted to receive and heat a cooking liquid in which food items may be cooked, such plurality of frypots being mounted in a closely adjacent side-by-side relationship within the upper internal portion of said housing, each of said frying vats having an upper cooking portion with a narrowed well portion depending therefrom;
    a heating system which heats the cooking liquid in each vat;
    a filter pan assembly having supports, said filter pan assembly having a filter pan with an inlet opening, a bottom wall from which a drainage sump depends, front, rear, and side walls which form a reservoir sized to receive and hold the entire cooking fluid content of a frying vat and a cooking fluid filter element operatively carried by said reservoir in order to filter cooking fluid passing between said inlet and said drainage sump;
    a filter pump and drive motor operatively associated with said filter pan assembly, the pump having an inlet communicating with the interior of said drainage sump and an outlet connected to a transfer line operable to convey oil under pressure through the transfer line to an oil distribution system;

an oil distribution system comprising:

an inlet manifold fluidly coupled to said transfer line, having return lines connected to each vat and an electrically operated valve in each return line;

a drain manifold with drain lines connected to each vat and an electrically operated valve in each drain line, said drain manifold having a drain for delivering drained oil through the inlet of the filter pan assembly when the filter pan assembly is received in said housing;

an oil supply line from a source of oil leading to the inlet manifold through a supply pump and an oil dispose line leading from the inlet manifold through an electrically operated valve;

said electrically operated valves having a closed position and an open position, respectively, which prevent or allow oil to pass through the valve and a position indicating switch having one position which signifies that said valve is closed;

a control system having circuits connecting said electrically operated valves and pumps, comprising a programmed oil management computer having an interface for displaying oil transfer functions and receiving operator selection inputs and converting these inputs into signals effective for operating said electrically operated valves and said pumps in sequence to accomplish transfer of oil between a given vat and said filter pan assembly, to transfer oil between vats by opening the drain valve on one vat while opening the return valve on a different vat, disposing of used oil by opening the drain valve on a used oil vat while opening a dispose valve, or providing oil from an oil supply by opening a return valve and operating the supply pump, all in response to operator inputs whereby oil drained from a given vat may be filtered to remove food remnants before entering any pump and oil from the plurality of vats may be filtered for reuse, transferred to an empty vat, conveyed to a disposal reservoir or oil may be supplied to a vat in accordance with selection of an oil transfer function without manually opening and closing valves in the oil distribution system.

8. The combination of claim 7 wherein the interface includes an oil transfer function which is a filter function and means for selecting the vat to be filtered, communicating with the oil management system computer, which is programmed to send signals sufficient to deactivate the heating system, open the drain valve in the selected vat, open the return valve in the selected vat and activate the filter pump in response to selection of the filter function and selection of the vat to be filtered.

9. The combination of claim 8 further including a pan position switch connected to a circuit of said control system, an electrical change in the circuit between the pan position switch and control system being indicative of the oil filter pan assembly being present in the housing to receive drained oil, the oil management computer being programmed to test the circuit for the pan position switch before opening the selected drain valve, displaying a message to the operator, and entering an error routine if the pan is not present, so that hot oil will not be drained on the floor.

10. The combination of claim 9 wherein the oil filter pan further includes an oil level sensor having a switch responsive to a full oil filter pan condition, the switch being connected in a circuit to said control system, the oil management computer being programmed to test said circuit of the oil level sensor switch to determine whether or not the oil filter pan is full before opening the selected drain valve, displaying a message to the operator and entering an error routine if the oil filter pan is already full, to prevent overflowing hot oil on the floor.

11. The combination of claim 8 wherein the oil management computer is programmed to set a time on a valve timer before opening said drain and return valves, testing the position of said valves by means of the position indicating switch on the valves, and entering an error routine if said valves are not in the desired position when the time has expired.

12. The combination of claim 11 wherein said oil management computer is programmed to set a wait time when the drain and return valves of the selected vat are open and the oil filter pump is on, decrementing the timer while the oil is being circulated between the selected vat and the oil filter pan whereby the oil is passed repeatedly through the oil filter until the wait time has expired, whereupon said selected drain valve is closed and the selected filter function is completed by continuing to operate the oil filter pump for a time sufficient to transfer the filtered oil back to the selected vat, then closing the return valve of the selected vat and shutting off the filter pump.

13. The combination of claim 12 further including a pressure switch on the output side of the filter pump operatively connected to the control system, said oil management computer being programmed to shut off the filter pump in response to a signal from said pressure switch indicative of a drop in pressure resulting from the presence of air.

14. The combination of claim 1 wherein the oil filter pan assembly includes an oil level sensor electrically connected to said control system, the oil level sensor being responsive to the presence of a substantial quantity of oil in the oil filter pan by altering an electrical circuit, the oil management computer being programmed to test said circuit before opening any of said electrically operated drain valves and entering an error routine if the test indicates a substantial quantity of oil is already in the oil filter pan so that additional oil will not be drained from a vat, in order to prevent exceeding the capacity of the oil filter pan.

15. The combination of claim 3 wherein the oil filter pan assembly includes an oil level sensor electrically connected to said control system, the oil level sensor being responsive to the presence of a substantial quantity of oil in the oil filter pan by altering an electrical circuit, the oil management computer being programmed to test said circuit before opening any of said electrically operated drain valves and entering an error routine if the test indicates a substantial quantity of oil is already in the oil filter pan so that additional oil will not be drained from a vat, in order to prevent exceeding the capacity of the oil filter pan.

16. The combination of one of claim 1 or claim 14 wherein the transfer line leading from the oil filter pump is in fluid communication with a dispose line having an electrically operated dispose valve electrically connected to said control system and said programmed oil management computer is programmed to close the return valve to each vat, open the dispose valve and operate the oil filter pump in response to an operator selected oil transfer function in order to transfer used oil from the oil filter pan through the dispose line to a disposal reservoir.

17. The combination of claim 2 wherein the transfer line leading from the oil filter pump is in fluid communication with a dispose line having an electrically operated dispose valve electrically connected to said control system and said programmed oil management computer is programmed to close the return valve to each vat, open the dispose valve and operate the oil filter pump in response to an operator selected oil transfer function in order to transfer used oil from the oil filter pan through the dispose line to a disposal reservoir.

18. The combination of claim 3 wherein the transfer line leading from the oil filter pump is in fluid communication with a dispose line having an electrically operated dispose valve electrically connected to said control system and said programmed oil management computer is programmed to close the return valve to each vat, open the dispose valve and operate the oil filter pump in response to an operator selected oil transfer function in order to transfer used oil from the oil filter pan through the dispose line to a disposal reservoir.

19. The combination of one of claim 1 or claim 14 wherein said transfer line includes an oil pressure sensor on the pressure side of the oil filter pump which provides a signal to the control system indicative of oil being pumped and the oil management computer is programmed to sense said signal, close the open electrically operated valves and shut off said oil filter pump in response to a signal from said oil pressure sensor indicating that oil is no longer being pumped.

20. The combination of claim 2 wherein said transfer line includes an oil pressure sensor on the pressure side of the oil filter pump which provides a signal to the control system indicative of oil being pumped and the oil management computer is programmed to sense said signal, close the open electrically operated valves and shut off said oil filter pump in response to a signal from said oil pressure sensor indicating that oil is no longer being pumped.

21. The combination of claim 3 wherein said transfer line includes an oil pressure sensor on the pressure side of the oil filter pump which provides a signal to the control system indicative of oil being pumped and the oil management computer is programmed to sense said signal, close the open electrically operated valves and shut off said oil filter pump in response to a signal from said oil pressure sensor indicating that oil is no longer being pumped.

22. The combination of claim 16 wherein said transfer line includes an oil pressure sensor on the pressure side of the oil filter pump which provides a signal to the control system indicative of oil being pumped and the oil management computer is programmed to sense said signal, close the open electrically operated valves and shut off said oil filter pump in response to a signal from said oil pressure sensor indicating that oil is no longer being pumped.

23. The combination of claim 17 wherein said transfer line includes an oil pressure sensor on the pressure side of the oil filter pump which provides a signal to the control system indicative of oil being pumped and the oil management computer is programmed to sense said signal, close the open electrically operated valves and shut off said oil filter pump in response to a signal from said oil pressure sensor indicating that oil is no longer being pumped.

* * * * *